(12) United States Patent
Matsumura et al.

(10) Patent No.: US 12,744,631 B2
(45) Date of Patent: Sep. 22, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 281 days.

(21) Appl. No.: 18/699,859

(22) PCT Filed: Oct. 7, 2022

(86) PCT No.: PCT/JP2022/037535
§ 371 (c)(1),
(2) Date: Apr. 9, 2024

(87) PCT Pub. No.: WO2023/063231
PCT Pub. Date: Apr. 20, 2023

(65) Prior Publication Data

US 2024/0413940 A1 Dec. 12, 2024

(30) Foreign Application Priority Data

Oct. 11, 2021 (JP) ................................ 2021-166868

(51) Int. Cl.
*H01L 29/94* (2006.01)
*H04L 1/08* (2006.01)
(Continued)

(52) U.S. Cl.
CPC .............. *H04L 5/0035* (2013.01); *H04L 1/08* (2013.01); *H04W 72/232* (2023.01)

(58) Field of Classification Search
CPC ....... H04L 5/0035; H04L 1/08; H04L 5/0053; H04W 72/232
See application file for complete search history.

(56) References Cited

U.S. PATENT DOCUMENTS

2021/0022152 A1* 1/2021 Yang ..................... H04L 5/0048
2021/0226688 A1* 7/2021 Khoshnevisan ... H04B 7/06964
(Continued)

FOREIGN PATENT DOCUMENTS

WO WO-2020011122 A1 * 1/2020 ........... H04L 5/0053

OTHER PUBLICATIONS

International Search Report issued in PCT/JP2022/037535 on Dec. 27, 2022 (3 pages).

(Continued)

*Primary Examiner* — Joseph Suh

(74) *Attorney, Agent, or Firm* — Osha Bergman Watanabe & Burton LLP

(57) ABSTRACT

A terminal includes a receiver that receives, in a specific control resource set (CORESET), downlink control information (DCI) not including a transmission configuration indication (TCI) field, the DCI being transmitted in a physical downlink control channel (PDCCH). The terminal also includes a processor that, when a physical downlink shared channel (PDSCH) is scheduled by the DCI and a time offset between reception of the DCI and reception of the PDSCH is greater than or equal to a threshold, assumes that a TCI state for the PDSCH is the same as a TCI state for the specific CORESET. Further, the processor determines, based on the specific CORESET, that one of a scheme for high-speed movement and a scheme for single transmission/reception point (TRP) is applied as a transmission scheme for the PDSCH.

6 Claims, 11 Drawing Sheets

(51) Int. Cl.
*H04L 5/00* (2006.01)
*H04W 72/232* (2023.01)

(56) References Cited

U.S. PATENT DOCUMENTS

| | | | | |
|---|---|---|---|---|
| 2022/0095357 | A1* | 3/2022 | Khoshnevisan | H04W 72/23 |
| 2022/0132543 | A1* | 4/2022 | Bai | H04W 72/044 |
| 2024/0015740 | A1* | 1/2024 | Xiao | H04L 5/0044 |
| 2024/0314804 | A1* | 9/2024 | Liu | H04L 5/0053 |

OTHER PUBLICATIONS

Written Opinion of the International Searching Authority issued in PCT/JP2022/037535 on Dec. 27, 2022 (3 pages).

Intel Corporation; "Enhancements to HST-SFN deployments"; 3GPP TSG RAN WG1 #106-e, R1-2107574; e-Meeting; Aug. 16-27, 2021 (10 pages).

Vivo; "Further discussion and evaluation on HST-SFN schemes"; 3GPP TSG RAN WG1 #104-e, R1-2100425; e-Meeting; Jan. 25-Feb. 5, 2021 (15 pages).

Huawei, HiSilicon; "Enhancements on high speed train for multi-TRP in Rel-17"; 3GPP TSG RAN WG1 Meeting #106bis-e, R1-2108760; e-Meeting; Oct. 11-19, 2021 (7 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG RAN WG1 #106bis-e; R1-2109203 "On Rel-17 FeMIMO UE features" CATT; e-Meeting, Oct. 11-19, 2021 (17 pages).

3GPP TSG RAN WG1 #106bis-e; R1-2109934 "Enhancements for HST-SFN deployment" Lenovo, Motorola Mobility; e-Meeting, Oct. 11-19, 2021 (12 pages).

3GPP TSG-RAN WG1#106bis-e; R1-2110107 "On Enhancements for HST-SFN deployment" Convida Wireless; e-Meeting, Oct. 11-19, 2021 (5 pages).

Office Action issued in Japanese Patent Application No. 2023-554477; Dated Mar. 17, 2026 (10 pages).

* cited by examiner

FIG. 1A

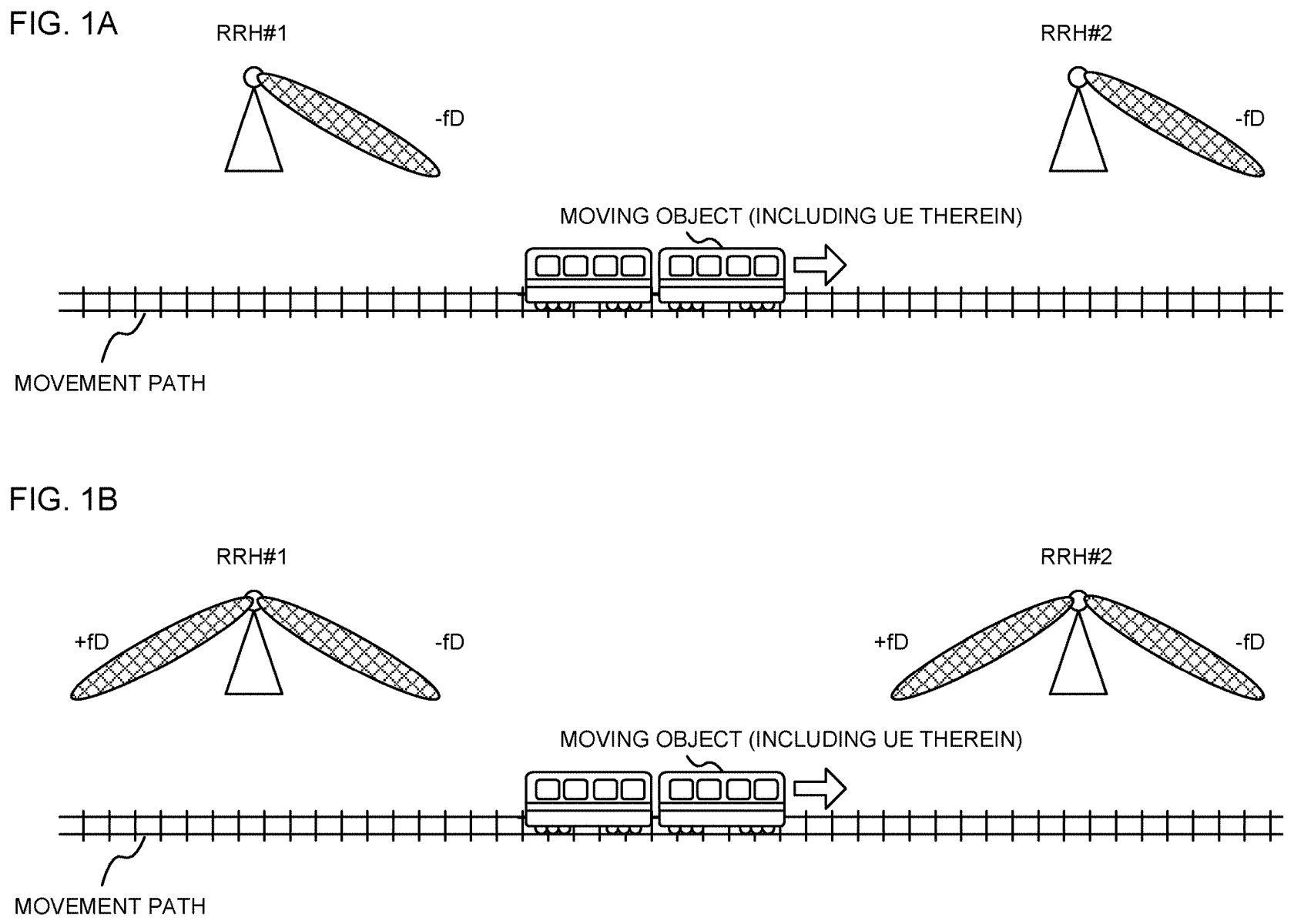

RRH#1

-fD

RRH#2

-fD

MOVING OBJECT (INCLUDING UE THEREIN)

MOVEMENT PATH

FIG. 1B

RRH#1

+fD

-fD

RRH#2

+fD

-fD

MOVING OBJECT (INCLUDING UE THEREIN)

MOVEMENT PATH

BBU
BBU
TRP#0
TRP#1
TRP#2
TRP#3
TRP#4
TRP#5
TRP#6
TRP#7
TRP#8
TRP#9
TRP#10
TRP#11
TRP#12
TRP#13
TRP#14
TRP#15
RRH#0
RRH#1
RRH#2
RRH#3
RRH#4
RRH#5
RRH#6
RRH#7
UE
MOVING OBJECT (INCLUDING UE THEREIN)
MOVEMENT PATH

TRS1-1
TRS1-2
TRS1-3
TRS1-4
TIME
TRS2-1
TRS2-2
TRS2-3
TRS2-4
TIME
DOPPLER SHIFTS ARE UNEQUAL

BBU#0
BBU#1
TRP#0
TRP#1
TRP#2
TRP#3
TRP#4
TRP#5
TRP#6
TRP#7
TRP#8
TRP#9
TRP#10
TRP#11
TRP#12
TRP#13
TRP#14
TRP#15
RRH#0
RRH#1
RRH#2
RRH#3
RRH#4
RRH#5
RRH#6
RRH#7
UE
MOVEMENT PATH
MOVING OBJECT (INCLUDING UE THEREIN)

RECEIVED SIGNAL STRENGTH
FREQUENCY
-fD
0
+fD

RECEIVED SIGNAL STRENGTH
FREQUENCY
0

| | | PDSCH | | | |
|---|---|---|---|---|---|
| | | Rel.15 | Rel.16 | Scheme 1 | Pre-compensation Scheme |
| PDCCH | Rel.15 | ALREADY STUDIED | | SUPPORTED | SUPPORTED |
| | Rel.17 URLLC | | | UNSUPPORTED | UNSUPPORTED |
| | Scheme 1 | UNSTUDIED | UNSTUDIED | SUPPORTED | UNSUPPORTED |
| | Pre-compensation Scheme | UNSTUDIED | UNSTUDIED | UNSUPPORTED | SUPPORTED |

FIG. 5

| PDCCH | PDSCH |
| --- | --- |
| SCHEME 2-1 | SCHEME 1-1 |
| SCHEMES 2-2 AND 2-3 | SCHEME 1-2 |
| SCHEME 2-4 | SCHEME 1-3 |
| SCHEME 2-5 | SCHEME 1-4 |

FIG. 6

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as “5th generation mobile communication system (5G),” “5G+ (plus),” “6th generation mobile communication system (6G),” “New Radio (NR),” “3GPP Rel. 15 (or later versions),” and so on) are also under study.

CITATION LIST

Non-Patent Literature

Non-Patent Literature 1: 3GPP TS 36.300 V8.12.0 “Evolved Universal Terrestrial Radio Access (E-UTRA) and Evolved Universal Terrestrial Radio Access Network (E-UTRAN); Overall description; Stage 2 (Release 8),” April, 2010

SUMMARY OF INVENTION

Technical Problem

For future radio communication systems (for example, NR), it is studied that a physical downlink control channel (PDCCH) reception method for higher reliability and high-speed movement is configured for a control resource set (CORESET).

However, for a terminal (user terminal, User Equipment (UE)), configuration of a transmission scheme for a PDCCH and a PDSCH has not been sufficiently studied. Unless such operation is definite, degradation in communication quality, reduction in throughput, and the like may occur.

Thus, an object of the present disclosure is to provide a terminal, a radio communication method, and a base station that appropriately configure a transmission scheme for a PDCCH and a PDSCH.

Solution to Problem

A terminal according to one aspect of the present disclosure includes a receiving section that receives at least one of first information related to a physical downlink control channel (PDCCH) transmission scheme and second information related to a physical downlink shared channel (PDSCH) transmission scheme, and a control section that determines, based on at least one of the first information and the second information, at least one of a first transmission scheme to be applied to reception of a PDCCH and a second transmission scheme to be applied to reception of a PDSCH.

The first transmission scheme is any one of a PDCCH transmission scheme for single transmission/reception point (TRP), a transmission scheme for PDCCH repetition transmission for multi-TRP, and a single frequency network (SFN) PDCCH transmission scheme, and the second transmission scheme is any one of a PDSCH transmission scheme for single TRP, a transmission scheme for PDSCH repetition transmission for multi-TRP, and an SFN PDSCH transmission scheme.

Advantageous Effects of Invention

According to one aspect of the present disclosure, it is possible to appropriately configure a transmission scheme for a PDCCH and a PDSCH.

BRIEF DESCRIPTION OF DRAWINGS

FIGS. 1A and 1B are diagrams to show examples of communication between a moving object and a transmission point (for example, an RRH).

FIG. 5 is a diagram to show studies of transmission schemes for a PDSCH and a PDCCH.

FIG. 6 is a diagram to show an example of correspondence between a PDCCH transmission scheme and a PDSCH transmission scheme.

Figure 2A:
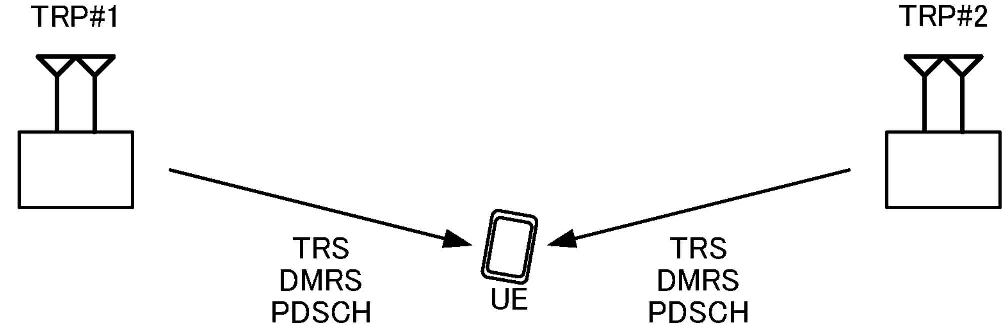
FIGS. 2A to 2C are diagrams to show examples of scheme 0 to scheme 2 related to an SFN.

DESCRIPTION OF EMBODIMENTS (TCI, Spatial Relation, QCL)

For NR, it is studied that reception processing (for example, at least one of reception, demapping, demodulation, and decoding) and transmission processing (for example, at least one of transmission, mapping, precoding, modulation, and coding), in a UE, of at least one of a signal and a channel (which is referred to as a signal/channel) is controlled based on a transmission configuration indication state (TCI state).

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a given channel/signal, and this RS may be referred to as a QCL source of QCL type X in the TCI state.

(Pathloss RS)

Pathloss $PL_{b,f,c}$ ($q_d$) [dB] in transmission power control for each of the PUSCH, the PUCCH, and the SRS is calculated by the UE using index $q_d$ of a reference signal (RS, pathloss reference RS (PathlossReferenceRS)) for a downlink BWP associated with active UL BWP b of carrier f in serving cell c. In the present disclosure, the pathloss reference RS, a pathloss (PL)-RS, index $q_d$, an RS used for pathloss calculation, and an RS resource used for pathloss calculation may be interchangeably interpreted. In the present disclosure, calculate, estimate, measure, and track may be interchangeably interpreted.

Whether an existing system with higher layer filtered RSRP for pathloss measurement is changed when the pathloss RS is updated by a MAC CE is under study.

When the pathloss RS is updated by the MAC CE, pathloss measurement based on L1-RSRP may be applied. At an available timing after the MAC CE for updating the pathloss RS, higher layer filtered RSRP may be used for pathloss measurement, and L1-RSRP may be used for pathloss measurement before the higher layer filtered RSRP is applied. At an available timing after the MAC CE for updating the pathloss RS, higher layer filtered RSRP may be used for pathloss measurement, and higher layer filtered RSRP of a previous pathloss RS may be used before the timing. In a manner similar to that of operation in Rel. 15, the higher layer filtered RSRP may be used for pathloss measurement, and the UE may track all pathloss RS candidates configured by RRC. A maximum number of pathloss RSs configurable by the RRC may depend on a UE capability. When the maximum number of pathloss RSs configurable by the RRC is X, pathloss RS candidates being X or less may be configured by the RRC, and a path loss RS may be selected by the MAC CE from the configured pathloss RS candidates. The maximum number of pathloss RSs configurable by the RRC may be 4, 8, 16, 64, or the like.

In the present disclosure, the higher layer filtered RSRP, filtered RSRP, and layer 3 filtered RSRP may be interchangeably interpreted.

(Default TCI State/Default Spatial Relation/Default PL-RS)

In Rel. 16, the PDSCH may be scheduled by DCI having a TCI field. A TCI state for the PDSCH is indicated by the TCI field. The TCI field in DCI format 1-1 is 3 bits, and the TCI field in DCI format 1-2 is up to 3 bits.

In an RRC connected mode, if a first TCI-in-DCI information element (higher layer parameter "tci-PresentInDCI") is set to "enabled" for a CORESET for scheduling the PDSCH, the UE assumes that the TCI field is present in DCI format 1_1 for a PDCCH transmitted in the CORESET.

If a second TCI-in-DCI information element (higher layer parameter "tci-PresentInDCI-1-2") for a CORESET for scheduling the PDSCH is configured for the UE, the UE assumes that the TCI field having a DCI field size indicated by the second TCI-in-DCI information element is present in DCI format 1_2 for a PDSCH transmitted in the CORESET.

In Rel. 16, the PDSCH may be scheduled by DCI not having the TCI field. A DCI format of the DCI may be DCI format 1_0 or DCI format 1_1/1_2 in a case where an TCI-in-DCI information element (higher layer parameter "tci-PresentInDCI" or "tci-Present InDCI-1-2") is not configured (enabled). When the PDSCH is scheduled by the DCI not having the TCI field and if time offset between reception of DL DCI (DCI for scheduling a PDSCH (scheduling DCI)) and a corresponding PDSCH (PDSCH scheduled by the DCI) is greater than or equal to a threshold value (timeDurationForQCL), the UE assumes that a TCI state or QCL assumption for the PDSCH is the same as a TCI state or QCL assumption (default TCI state) for the CORESET (for example, the scheduling DCI).

In an RRC connected mode, in both a case where an TCI-in-DCI information element (higher layer parameters "tci-PresentInDCI" and "tci-PresentInDCI-1-2") is set to "enabled" and a case where the TCI-in-DCI information element is not configured, when time offset between reception of DL DCI (DCI for scheduling a PDSCH) and a corresponding PDSCH (PDSCH scheduled by the DCI) is less than a threshold value (timeDurationForQCL) (application condition, first condition), a TCI state (default TCI state) for the PDSCH may, in a case of non-cross carrier scheduling, be a TCI state with the lowest CORESET ID in the latest slot in an active DL BWP of that CC (for a specific UL signal). Otherwise, the TCI state (default TCI state) for the PDSCH may be a TCI state with the lowest TCI state ID for a PDSCH in an active DL BWP of a CC to be scheduled.

In Rel. 15, respective ones of a PUCCH spatial relation activation/deactivation MAC CE and an SRS spatial relation activation/deactivation MAC CE are necessary. A PUSCH spatial relation follows an SRS spatial relation.

In Rel. 16, at least one of the PUCCH spatial relation activation/deactivation MAC CE and the SRS spatial relation activation/deactivation MAC CE may not be used.

If both a spatial relation and a PL-RS for a PUCCH are not configured in FR2 (application condition, second condition), default assumption for the spatial relation and the PL-RS (default spatial relation and default PL-RS) is applied to the PUCCH. If both a spatial relation and a PL-RS for an SRS (SRS resource for the SRS or SRS resource corresponding to SRI in DCI format 0_1 for scheduling a PUSCH) are not configured in FR2 (application condition, second condition), default assumption for the spatial relation and the PL-RS (default spatial relation and default PL-RS) is applied to the PUSCH scheduled by DCI format 0_1, and the SRS.

If CORESETs are configured in an active DL BWP on the CC (application condition), the default spatial relation and the default PL-RS may be a TCI state or QCL assumption for a CORESET having the lowest CORESET ID in the active DL BWP. If CORESETS are not configured in the active DL BWP on that CC, the default spatial relation and the default PL-RS may be an active TCI state having the lowest ID for a PDSCH in the active DL BWP.

In Rel. 15, a spatial relation of a PUSCH scheduled by DCI format 0_0 follows a spatial relation of a PUCCH resource out of active spatial relations of PUCCHs on the same CC, the PUCCH resource having the lowest PUCCH resource ID. A network needs to update PUCCH spatial relations on all SCells even when the PUCCH is not transmitted on the SCell.

In Rel. 16, PUCCH configuration for the PUSCH scheduled by DCI format 0_0 is unnecessary. When an active PUCCH spatial relation or a PUCCH resource for the PUSCH scheduled by DCI format 0_0 is absent on an active UL BWP in the CC (application condition, second condition), a default spatial relation and a default PL-RS are applied to the PUSCH.

A condition for application of the default spatial relation/default PL-RS for the SRS may include an information element for enabling a default beam pathloss for the SRS (higher layer parameter "enableDefaultBeamPlForSRS") set to "enabled." A condition for application of the default spatial relation/default PL-RS for the PUCCH may include an information element for enabling a default beam pathloss for the PUCCH (higher layer parameter "enableDefaultBeamPlForPUCCH") set to "enabled." A condition for application of the default spatial relation/default PL-RS for the PUSCH scheduled by DCI format 0_0 may include an information element for enabling a default beam pathloss for the PUSCH scheduled by DCI format 0_0 (higher layer parameter "enableDefaultBeamPlForPUSCH0_0") set to "enabled."

In Rel. 16, when an RRC parameter (parameter for enabling a default beam PL for PUCCH) (enableDefaultBeamPL-ForPUCCH), parameter for enabling a default beam PL for PUSCH) (enableDefaultBeamPL-ForPUSCH0_0), or parameter for enabling a default beam PL for SRS) (enableDefaultBeamPL-ForSRS)) is configured for the UE, and a spatial relation or a PL-RS is not configured for the UE, the UE applies a default spatial relation/PL-RS.

The above threshold value may be referred to as a time length (time duration) for QCL, "timeDurationForQCL," "Threshold," "Threshold for offset between a DCI indicating a TCI state and a PDSCH scheduled by the DCI," "Threshold-Sched-Offset," "beamSwitchTiming," a schedule offset threshold value, a scheduling offset threshold value, or the like. The above threshold value may be reported by the UE as a UE capability (for each subcarrier spacing).

When offset (scheduling offset) between reception of DL DCI and a PDSCH corresponding to the DL DCI is less than a threshold value "timeDurationForQCL," at least one TCI state configured for a serving cell with a scheduled PDSCH includes "QCL type D," the UE is configured with an information element for enabling 2 default TCIs (enableTwoDefaultTCIStates-r16), and at least one TCI codepoint (codepoint of a TCI field in the DL DCI) indicates two TCI states, the UE assumes that a DMRS port for the PDSCH or PDSCH transmission occasion in the serving cell is QCLed (quasi co-located) with an RS related to a QCL parameter associated with two TCI states corresponding to the lowest codepoint of TCI codepoints including two different TCI states (2 default QCL assumption determination rule). The information element for enabling 2 default TCIs indicates that Rel-16 operation with two default TCI states for a PDSCH in a case where at least one TCI codepoint is mapped to two TCI states is enabled.

As a default TCI state of a PDSCH in Rel. 15/16, specifications of a default TCI state for single TRP, a default TCI state for multi-DCI-based multi-TRP, and a default TCI state for single DCI-based multi-TRP are drafted.

As a default TCI state of an aperiodic CSI-RS (A (aperiodic)-CSI-RS) in Rel. 15/16, specifications of a default TCI state for single TRP, a default TCI state for multi-DCI-based multi-TRP, and a default TCI state for single DCI-based multi-TRP are drafted.

In Rel. 15/16, specifications of default spatial relations and default PL-RSs for respective ones of PUSCH/PUCCH/SRS are drafted.

(Multi-TRP)

For NR, it is studied that one or a plurality of transmission/reception points (TRPs) (multi-TRP (multi TRP (MTRP))) perform DL transmission to a UE by using one or a plurality of panels (multi-panel). It is also studied that the UE performs UL transmission to the one or plurality of TRPs by using one or a plurality of panels.

Note that the plurality of TRPs may correspond to the same cell identifier (ID) or may correspond to different cell IDs. The cell ID may be a physical cell ID or a virtual cell ID.

The multi-TRP (for example, TRPs #1 and #2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be used.

In NCJT, for example, TRP #1 performs modulation mapping on a first codeword, performs layer mapping, and transmits a first PDSCH in a first number of layers (for example, two layers) by using first precoding. TRP #2 performs modulation mapping on a second codeword, performs layer mapping, and transmits a second PDSCH in a second number of layers (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a given QCL type (for example, QCL type D).

A plurality of PDSCHs (which may be referred to as multi-PDSCH (multiple PDSCHs)) from the multi-TRP may be scheduled by using one DCI (single DCI, single PDCCH) (single master mode, multi-TRP based on single DCI (single-DCI based multi-TRP)). The plurality of PDSCHs from the multi-TRP may be separately scheduled by using a plurality of DCIs (multi-DCI, multi-PDCCH (multiple PDCCHs)) (multi-master mode, multi-TRP based on multi-DCI (multi-DCI based multi-TRP)).

For Ultra-Reliable and Low Latency Communications (URLLC) for multi-TRP, support of PDSCH (transport block (TB) or codeword (CW)) repetition over multi-TRP is under study. Support of a scheme for repetition over multi-TRP on a frequency domain, a layer (space) domain, or a time domain (URLLC schemes and reliability enhancement schemes, for example, schemes 1a, 2a, 2b, 3, and 4) is under study. In scheme 1a, multi-PDSCH from multi-TRP is space division multiplexed (SDMed). In schemes 2a and 2b, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario, more flexible transmission control using a high quality channel is possible.

To support intra-cell (with the same cell ID) and inter-cell (with different cell IDs) multi-TRP transmission based on a plurality of PDCCHs, one control resource set (CORESET) in PDCCH configuration information (PDCCH-Config) may correspond to one TRP in RRC configuration information for linking a plurality of pairs of a PDCCH and a PDSCH with a plurality of TRPs.

When at least one of conditions 1 and 2 below is satisfied, the UE may determine that it is multi-TRP based on multi-DCI. In this case, a TRP may be interpreted as a CORESET pool index.

{Condition 1}

One CORESET pool index is configured.

{Condition 2}

Two different values (for example, 0 and 1) of a CORESET pool index are configured.

When the following condition is satisfied, the UE may determine that it is multi-TRP based on single DCI. In this case, two TRPs may be interpreted as two TCI states indicated by a MAC CE/DCI.

{Condition}

To indicate one or two TCI states for one codepoint of a TCI field in DCI, an "enhanced TCI states activation/deactivation for UE-specific PDSCH MAC CE" is used.

DCI for common beam indication may be a UE-specific DCI format (for example, DL DCI format (for example, 1_1, 1_2)), may be a UL DCI format (for example, 0_1, 0_2), or may be a UE-group common DCI format.

(Multi-TRP PDCCH)

For reliability of a multi-TRP PDCCH based on a non-single frequency network (SFN), study 1 to study 3 below are under study.

{Study 1} Coding/rate matching is based on one repetition, and the same code bit is repeated in another repetition.

{Study 2} Respective repetitions have the same number of control channel elements (CCEs) and the same code bit, and correspond to the same DCI payload.

{Study 3} Two or more PDCCH candidates are explicitly linked to each other. The UE recognizes the link before decoding.

Choice 1-2, choice 1-3, choice 2, and choice 3 below for PDCCH repetition are under study.

{Choice 1-2}

Two sets of PDCCH candidates (in a given search space (SS) set) are associated with two respective TCI states of a CORESET. Here, the same CORESET, the same SS set, and PDCCH repetition in different monitoring occasions are used.

{Choice 1-3}

Two sets of PDCCH candidates are associated with two respective SS sets. Both of the SS sets are associated with a CORESET, and each SS set is associated with only one TCI state of the CORESET. Here, the same CORESET and two SS sets are used.

{Choice 2}

One SS set is associated with two different CORESETs.

{Choice 3}

Two SS sets are associated with two respective CORESETs.

Thus, it is studied that two PDCCH candidates in two SS sets for PDCCH repetition are supported and the two SS sets are explicitly linked to each other.

(SFN PDCCH)

With respect to a PDCCH/CORESET defined in Rel. 15, one TCI state without a CORESET pool index (CORESETPoolIndex) (which may be referred to as TRP information (TRP Info)) is configured for one CORESET.

With respect to PDCCH/CORESET enhancement defined in Rel. 16, a CORESET pool index is configured for each CORESET in multi-DCI based multi-TRP.

For Rel. 17 (or later versions), enhancement 1 and enhancement 2 below related to a PDCCH/CORESET are under study.

In a case where a plurality of antennas (small antennas, transmission/reception points) having the same cell ID form a single frequency network (SFN), up to two TCI states can be configured/activated for one CORESET by using higher layer signaling (RRC signaling/MAC CE) (enhancement 1). The SFN contributes to at least one of operation and reliability enhancement of an HST (high speed train).

In PDCCH repetition transmission (which may be simply referred to as "repetition"), two PDCCH candidates in two search space sets are linked to each other, and each search space set is associated with a corresponding CORESET (enhancement 2). The two search space sets may be associated with the same or different CORESETs. One (up to one) TCI state can be configured/activated for one CORESET by using higher layer signaling (RRC signaling/MAC CE).

If the two search space sets are associated with different CORESETs having different TCI states, the transmission may mean multi-TRP repetition transmission. If the two search space sets are associated with the same CORESET (CORESETs with the same TCI state), the transmission may mean single-TRP repetition transmission.

(HST)

In LTE, arrangement of an HST (high speed train) in a tunnel is difficult. A large antenna performs transmission to the outside/inside of the tunnel. For example, transmission power of the large antenna is about 1 to 5 W. For handover, it is important to perform transmission to the outside of the tunnel before the UE enters the tunnel. For example, transmission power of a small antenna is about 250 mW. A plurality of small antennas (transmission/reception points) having the same cell ID and being separated with a distance of 300 m form a single frequency network (SFN). All small antennas in the SFN transmit the same signals at the same time on the same PRB. Assume that a terminal performs transmission/reception to/from one base station. Actually, the plurality of transmission/reception points transmit identical DL signals. In high-speed movement, transmission/reception points in units of several km form one cell. The handover is performed when moving to another cell. Therefore, frequency of the handover can be reduced.

In NR, it is assumed that a beam transmitted from a transmission point (for example, an RRH) is used to perform communication with a terminal (also described hereinafter as a UE) included in a moving object (HST (high speed train)), such as a train moving at a high speed. In existing systems (for example, Rel. 15), communication with the moving object performed by transmitting a unidirectional beam from the RRH is supported (see FIG. 1A).

FIG. 1A shows a case where RRHs are arranged along a movement path (or direction of movement, direction of travel, travel path) of the moving object and where a beam is formed from each RRH towards the direction of travel of the moving object. The RRH for forming the unidirectional beam may be referred to as a uni-directional RRH. In an example shown in FIG. 1A, the moving object receives a negative Doppler shift ($-f_D$) from each RRH.

Note that FIG. 1A shows a case where the beam is formed towards the direction of travel of the moving object, but is not limited to this, and the beam may be formed towards a direction opposite to the direction of travel, or the beam may be formed towards any direction regardless of the direction of travel of the moving object.

In Rel. 16 (or later versions), it is also assumed that a plurality of (for example, two or more) beams are transmitted from the RRH. For example, it is assumed that beams are formed towards both a direction of travel of the moving object and the opposite direction (see FIG. 1B).

FIG. 1B shows a case where RRHs are installed along a movement path of the moving object and where beams are formed from each RRH towards both the direction of travel of the moving object and a direction opposite to the direction of travel. The RRH for forming a multi-directional (for example, bi-directional) beam may be referred to as a bi-directional RRH.

In the HST, the UE performs communication in a manner similar to that in a single TRP. In base station implementation, transmission from a plurality of TRPs (same cell IDs) can be performed.

In an example in FIG. 1B, when two RRHs (here, RRH #1 and RRH #2) use the SFN, the moving object switches, in the middle of the two RRHs, from a signal with a received negative Doppler shift, to a signal with a received positive Doppler shift, which causes power increase. In this case, a maximum width of a Doppler shift change requiring compensation is a change from $-f_D$ to $+f_D$, and doubles as compared with that of the unidirectional RRH.

Note that in the present disclosure, the positive Doppler shift may be interpreted as information related to a positive Doppler shift, a Doppler shift in a positive direction, or Doppler information in a positive direction. The negative Doppler shift may be interpreted as information related to a negative Doppler shift, a Doppler shift in a negative direction, or Doppler information in a negative direction.

Here, as HST schemes, scheme 0 to scheme 2 (HST scheme 0 to HST scheme 2) below will be compared with each other.

In scheme 0 in FIG. 2A, a tracking reference signal (TRS), a DMRS, and a PDSCH are transmitted in common with two TRPs (RRHs) (by using the same time and frequency resources) (normal SFN, transparent SFN, HST-SFN).

In scheme 0, the UE receives a DL channel/signal by using the equivalent of the single TRP, and thus a TCI state for the PDSCH is one.

Note that in Rel. 16, an RRC parameter for distinction between transmission using the single TRP and transmission using the SEN is defined. When reporting corresponding UE capability information, the UE may distinguish, based on the RRC parameter, between reception of the DL channel/signal with the single TRP and reception of the PDSCH with assumption of the SFN. On the other hand, the UE may perform transmission/reception using the SFN by assuming the single TRP.

Figure 2B:
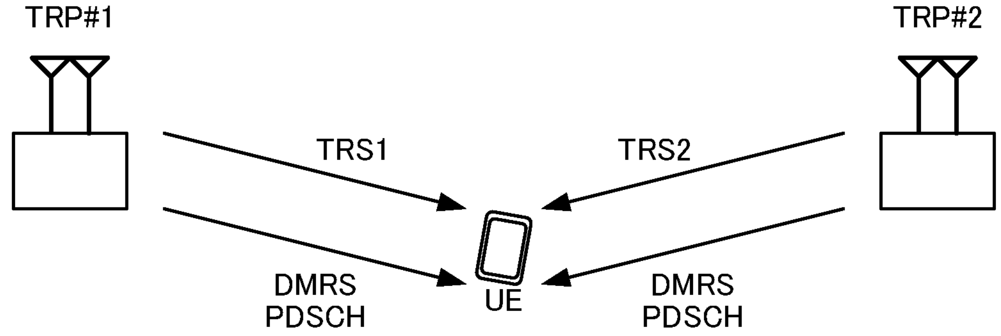

In scheme 1 in FIG. 2B, the TRS is transmitted in a TRP-specific manner (by using a time/frequency resource varying depending on a TRP). In this example, TRS 1 is transmitted from TRP #1, and TRS 2 is transmitted from TRP #2.

In scheme 1, the UE receives a DL channel/signal from each TRP by using a TRS from each TRP, and thus TCI states for the PDSCH are two.

Figure 2C:
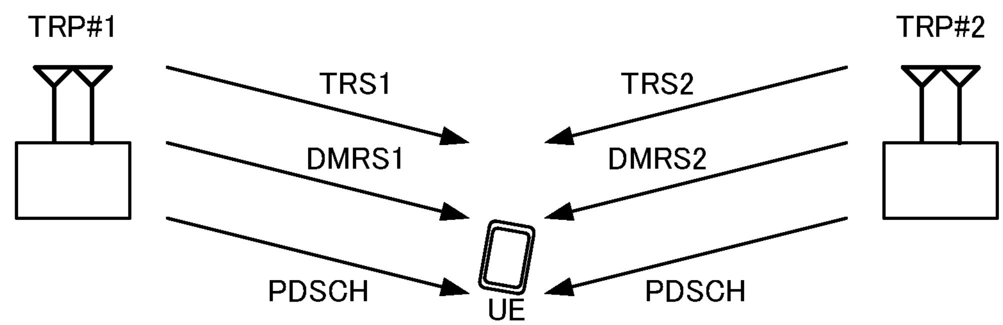

In scheme 2 in FIG. 2C, the TRS and the DMRS are transmitted in a TRP-specific manner. In this example, TRS 1 and DMRS 1 are transmitted from TRP #1, and TRS 2 and DMRS 2 are transmitted from TRP #2. Scheme 1 and scheme 2 can suppress a quick change of a Doppler shift and can appropriately estimate/compensate the Doppler shift, as compared with scheme 0. The DMRS in scheme 2 increases more than the DMRS in scheme 1, and thus maximum throughput in scheme 2 is lower than that in scheme 1.

In scheme 0, the UE performs switching between the single TRP and the SFN, based on higher layer signaling (RRC information element/MAC CE).

The UE may perform switching between scheme 1/scheme 2/NW pre-compensation scheme, based on the higher layer signaling (RRC information element/MAC CE).

In scheme 1, two TRS resources are configured for respective ones of a direction of travel of the HST and the opposite direction.

Figures 3A, 3B:
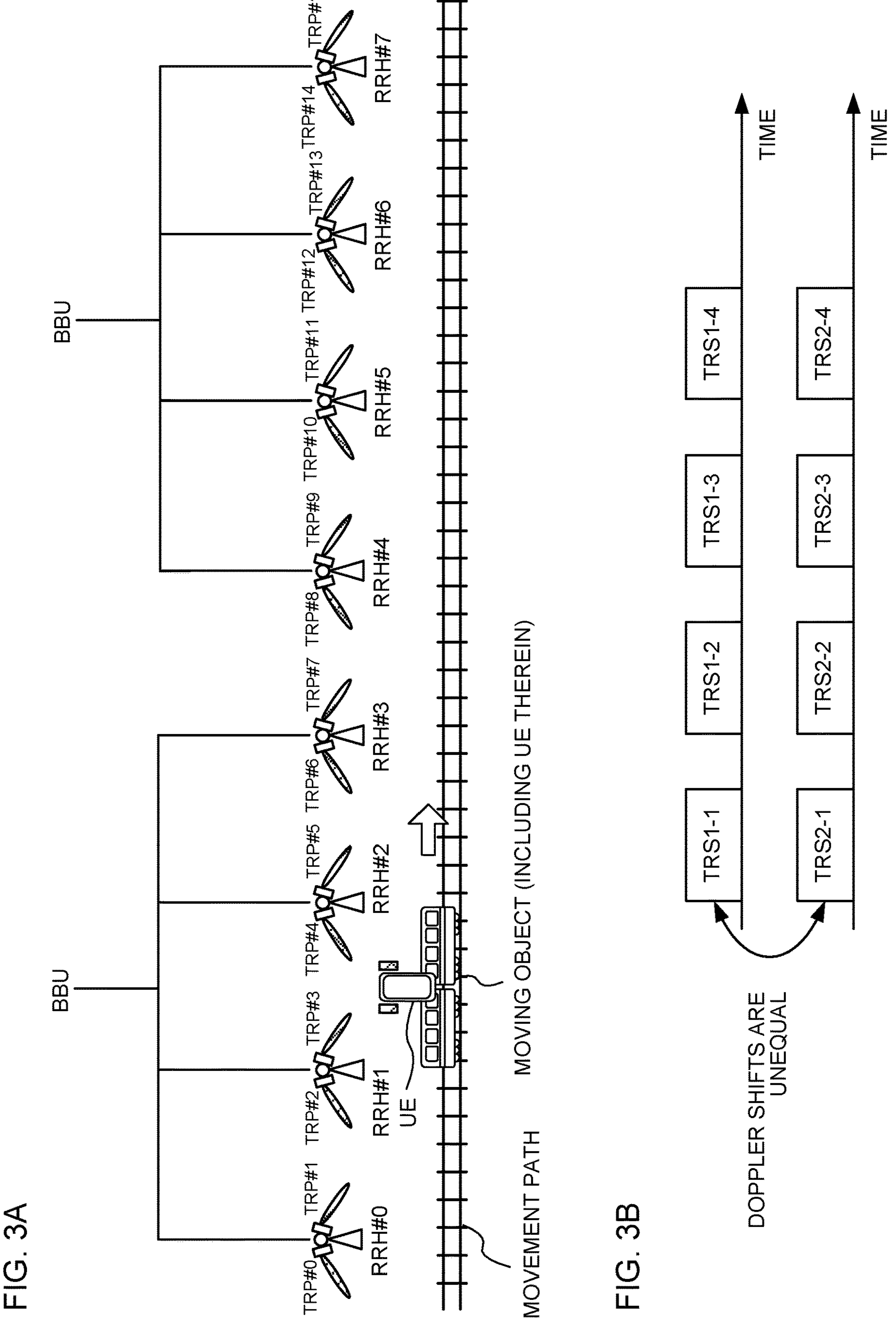
FIGS. 3A and 3B are diagrams to show an example of scheme 1.

In an example in FIG. 3A, TRPs (TRPs #0, #2, . . . ) for transmitting DL signals towards the opposite direction of the HST transmit a first TRS (TRS arriving from in front of the HST) in identical time and frequency resources (SFN). TRPs (TRPs #1, #3, . . . ) for transmitting DL signals towards the direction of travel of the HST transmit a second TRS (TRS arriving from behind the HST) in identical time and frequency resources (SFN). The first TRS and the second TRS may be transmitted/received by using different frequency resources.

In an example in FIG. 3B, TRSs 1-1 to 1-4 are transmitted as the first TRS, and TRSs 2-1 to 2-4 are transmitted as the second TRS.

Considering beam management, the first TRS is transmitted by using 64 beams and 64 time resources, and the second TRS is transmitted by using 64 beams and 64 time resources. It is conceivable that a beam of the first TRS and a beam of the second TRS are equal to each other (QCL type D RSs are equal to each other). Multiplexing the first TRS and the second TRS in identical time resources and different frequency resources can enhance resource use efficiency.

Figures 4A, 4B, 4C:
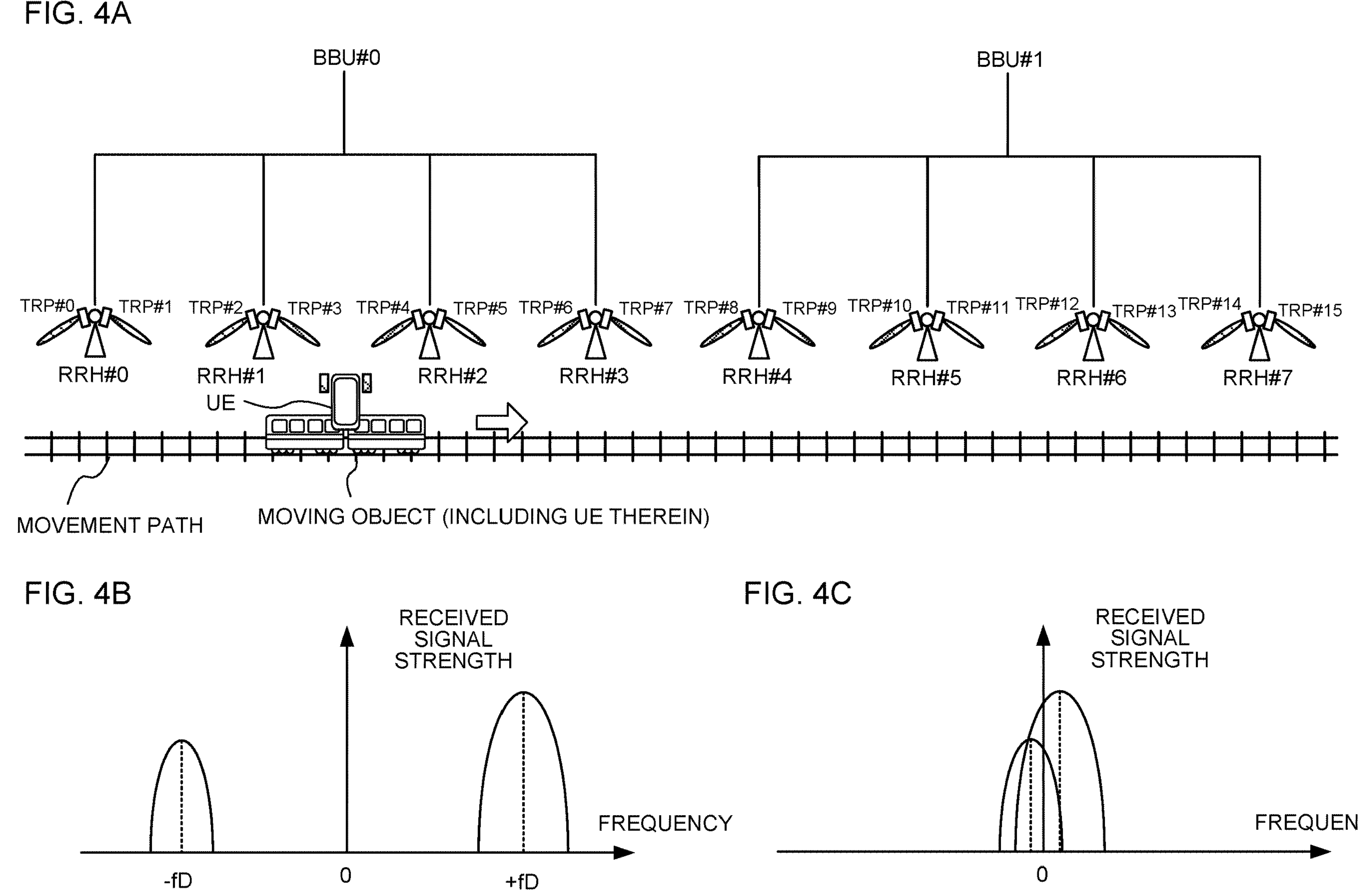
FIGS. 4A to 4C are diagrams to show an example of a Doppler pre-compensation scheme.

In an example in FIG. 4A, RRHs #0 to #7 are arranged along a movement path of the HST. RRHs #0 to #3 and RRHs #4 to #7 are connected to base band unit (BBU) #0 and BBU #1, respectively. Each RRH is a bi-directional RRH, and forms beams towards both the direction of travel and the opposite direction on the movement path by using each transmission/reception point (TRP).

In a received signal in an example in FIG. 4B (single TRP (SFN)/scheme 1), when the UE receives a signal/channel transmitted from TRP #2n−1 (n is an integer being 0 or more) (beam in the direction of travel of the HST, beam from behind the UE), negative Doppler shift (in this example, −fD) occurs. When the UE receives a signal/channel transmitted from TRP #2n (n is an integer being 0 or more) (beam in a direction opposite to the direction of travel of the HST, beam from in front of the UE), positive Doppler shift (in this example, +fD) occurs.

For Rel. 17 (or later versions), it is studied that a base station performs a Doppler pre-(preliminary) compensation (correction) scheme (Pre-Doppler Compensation scheme, Doppler pre-Compensation scheme, network (NW) pre-compensation scheme (NW pre-compensation scheme, HST NW pre-compensation scheme), TRP pre-compensation scheme, TRP-based pre-compensation scheme) in downlink (DL) signal/channel transmission from a TRP to a UE in an HST. The TRP performs Doppler compensation beforehand when performing DL signal/channel transmission to the UE, thereby allowing an impact of Doppler shift in DL signal/channel reception in the UE to be reduced. In the present disclosure, the Doppler pre-compensation scheme may be a combination of scheme 1 and Doppler shift pre-compensation by the base station.

For the Doppler pre-compensation scheme, it is studied that a TRS from each TRP is transmitted without Doppler pre-compensation for the TRS and a PDSCH from each TRP is transmitted with Doppler pre-compensation for the PDSCH.

In the Doppler pre-compensation scheme, a TRP for forming a beam towards the direction of travel on the movement path and a TRP for forming a beam towards the direction opposite to the direction of travel on the movement path perform DL signal/channel transmission to the UE in the HST after performing Doppler compensation. In this example, TRP #2n−1 performs positive Doppler compensation, and TRP #2n performs negative Doppler compensation, thereby reducing an impact of Doppler shift in signal/channel reception by the UE (FIG. 4C).

Note that in a situation shown in FIG. 4C, the UE receives a DL channel/signal from each TRP by using a TRS from each TRP, and thus TCI states for the PDSCH may be two.

Furthermore, for Rel. 17 (or later versions), dynamic switching, with a TCI field (TCI state field), between the single TRP and the SFN is under study. For example, one or two TCI states are configured/indicated in each TCI codepoint (codepoint of the TCI field, DCI codepoint) by using an RRC information element/MAC CE (for example, Enhanced TCI States Activation/Deactivation for UE-specific PDSCH MAC CE)/DCI (TCI field). The UE may determine that a PDSCH from the single TRP is received when one TCI state is configured/indicated. The UE may determine that a PDSCH from the SEN using multi-TRP is received when two TCI states are configured/indicated.

(Analysis)

For Rel. 17 (or later versions), support of enhancement of an SFN transmission scheme (for example, scheme 1 and TRP-based pre-compensation scheme) is under study.

Specifically, it is studied that a UE controls/operates so as not to assume that different SFN transmission schemes are configured for a PDSCH and a PDCCH. It is studied that the UE supports an SFN PDSCH scheduled by a PDCCH from a single TRP.

FIG. 5 is a diagram to show studies of transmission schemes for the PDCCH and the PDSCH. In FIG. 5, a study has not been sufficiently performed with respect to at least one of PDSCH scheduling using a PDCCH in scheme 1 and defined in Rel. 15/16, and PDSCH scheduling using the TRP-based pre-compensation scheme and defined in Rel. 15/16.

Note that, in FIG. 5, scheme 1 may include an SFN PDCCH and an SFN PDCCH for higher reliability. Transmission using PDCCH repetition transmission (two PDCCHs linked to each other) is also under study, although description thereof is not included in FIG. 5.

Unless these studies are sufficiently performed, appropriate determination of a transmission scheme for the PDCCH and the PDSCH may fail, and degradation in communication quality, reduction in throughput, and the like may occur.

Thus, the inventors of the present invention came up with the idea of a method for appropriately configuring/applying a transmission scheme for a PDCCH and a PDSCH.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, a sequence, a list, a set, a group, a cluster, a subset, and the like may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), an RRC message, and configuration may be interchangeably interpreted.

The MAC signaling may use, for example, a MAC control element (MAC CE), a MAC Protocol Data Unit (PDU), or the like. In the present disclosure, a MAC CE, an update command, and an activation/deactivation command may be interchangeably interpreted.

The broadcast information may be, for example, a master information block (MIB), a system information block (SIB), minimum system information (Remaining Minimum System Information (RMSI), SIB 1), other system information (OSI), or the like.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), a base station, an antenna port for a given signal (for example, a demodulation reference signal (DMRS) port), a DMRS, an antenna port group for a given signal (for example, a DMRS port group), a group for multiplexing (for example, a code division multiplexing (CDM) group, a reference signal group, or a CORESET group), a Physical Uplink Control Channel (PUCCH) group, a PUCCH resource group, a resource (for example, a reference signal resource or an SRS resource), a resource set (for example, a reference signal resource set), a CORESET pool, a CORESET subset, a downlink Transmission Configuration Indication state (TCI state) (DL TCI state), an uplink TCI state (UL TCI state), a unified TCI state, a common TCI state, quasi-co-location (QCL), QCL assumption, a redundancy version (RV), and a layer (multi-input muti-output (MIMO) layer, transmission layer, spatial layer) may be interchangeably interpreted. A panel Identifier (ID) and a panel may be interchangeably interpreted. In the present disclosure, a TRP ID and a TRP may be interchangeably interpreted.

The panel may be related to at least one of a group index of an SSB/CSI-RS group, a group index of group-based beam report, and a group index of an SSB/CSI-RS group for group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, it may be assumed that a single PDCCH (DCI) is supported when multi-TRP uses ideal backhaul. It may be assumed that multi-PDCCH (DCI) is supported when multi-TRP uses non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. The names are not limited to these.

In the present disclosure, a single TRP, a single-TRP system, single-TRP transmission, and a single PDSCH may be interchangeably interpreted. In the present disclosure, multi-TRP (multiple TRPs), a multi-TRP system, multi-TRP transmission, and multi-PDSCH may be interchangeably interpreted. In the present disclosure, single DCI, a single PDCCH, multi-TRP based on single DCI, and two TCI states in at least one TCI codepoint being activated may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, and one CORESET pool index (CORESETPoolIndex) value being not configured for any CORESET and any codepoint of a TCI field being not mapped to two TCI states may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted. In the present disclosure, multi-TRP based on multi-DCI and one CORESET pool index (CORESETPoolIndex) value being configured for a CORESET may be interchangeably interpreted. In the present disclosure, multi-TRP based on single DCI and at least one codepoint in a TCI field being mapped to two TCI states may be interchangeably interpreted.

In the present disclosure, TRP #1 (first TRP) may correspond to CORESET pool index=0, or may correspond to a first TCI state of two TCI states corresponding to one codepoint of a TCI field. TRP #2 (second TRP) TRP #1 (first TRP) may correspond to CORESET pool index=1, or may correspond to a second TCI state of the two TCI states corresponding to one codepoint of the TCI field.

In the present disclosure, single DCI (sDCI), a single PDCCH, a multi-TRP system based on single DCI, sDCI-based MTRP, and two TCI states in at least one TCI codepoint being activated may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

QCL in the present disclosure may be interchangeably interpreted as QCL type D.

In the present disclosure, "TCI state A is of the same QCL type D as that of TCI state B," "TCI state A and TCI state B are the same," "TCI state A is QCL type D with TCI state B," and the like may be interchangeably interpreted.

In the present disclosure, a codepoint of a DCI field 'Transmission Configuration Indication,' a TCI codepoint, a DCI codepoint, and a codepoint of a TCI field may be interchangeably interpreted.

In the present disclosure, a single TRP and an SFN may be interchangeably interpreted. In the present disclosure, an HST, an HST scheme, a scheme for high-speed movement, scheme 1, scheme 2, an NW pre-compensation scheme, HST scheme 1, HST scheme 2, and an HST NW pre-compensation scheme may be interchangeably interpreted.

In the present disclosure, a PDSCH/PDCCH using a single TRP may be interpreted as a single TRP-based PDSCH/PDCCH or a single TRP PDSCH/PDCCH. In the present disclosure, a PDSCH/PDCCH using an SFN may be interpreted as a PDSCH/PDCCH using multiple SFNs, a PDSCH/PDCCH based on an SFN, or an SFN PDSCH/PDCCH.

In the present disclosure, DL signal (PDSCH/PDCCH) reception using an SFN may mean reception using identical time/frequency resources and/or reception of identical data (PDSCHs)/control information (PDCCHs) from a plurality of transmission/reception points. The DL signal reception using the SFN may mean reception using identical time/frequency resources and/or reception, with a plurality of TCI states/spatial domain filters/beams/QCLs, of identical data/control information.

In the present disclosure, an HST-SFN scheme, an SFN scheme in Rel. 17 (or later versions), a new SFN scheme, a new HST-SFN scheme, an HST-SFN scenario in Rel. 17 (or later versions), an HST-SFN scheme for an HST-SFN scenario, an SFN scheme for an HST-SFN scenario, scheme 1, HST-SFN scheme A/B, HST-SFN type A/B, a Doppler pre-compensation scheme, and at least one of scheme 1 (HST scheme 1) and the Doppler pre-compensation scheme may be interchangeably interpreted.

In the present disclosure, the Doppler pre-compensation scheme, a base station pre-compensation scheme, a TRP pre-compensation scheme, a pre-Doppler compensation scheme, a Doppler pre-compensation scheme, an NW pre-compensation scheme, an HST NW pre-compensation scheme, a TRP pre-compensation scheme, a TRP-based pre-compensation scheme, HST-SFN scheme A/B, and HST-SFN type A/B may be interchangeably interpreted. In the present disclosure, the pre-compensation scheme, a reduction scheme, an improvement scheme, and a correction scheme may be interchangeably interpreted.

In the present disclosure, PDCCHs/search spaces (SSs)/CORESETs having a linkage, PDCCHs/SSs/CORESETs linked to each other, and a pair of PDCCHs/SSs/CORESETs may be interchangeably interpreted. In the present disclosure, PDCCHs/SSs/CORESETs not having a linkage, PDCCHs/SSs/CORESETs not linked to each other, and individual PDCCHs/SSs/CORESETs may be interchangeably interpreted.

In the present disclosure, two CORESETs linked to each other for PDCCH repetition and two CORESETs associated with two respective SS sets linked to each other may be interchangeably interpreted.

In the present disclosure, SFN-PDCCH repetition, PDCCH repetition, two PDCCHs linked to each other, and one DCI received over two search spaces (SSs)/CORESETs linked to each other may be interchangeably interpreted.

In the present disclosure, PDCCH repetition, SFN-PDCCH repetition, PDCCH repetition for higher reliability, a PDCCH for higher reliability, a PDCCH for reliability, and two PDCCHs linked to each other may be interchangeably interpreted.

In the present disclosure, a PDCCH reception method, PDCCH repetition, SFN-PDCCH repetition, HST-SFN, and an HST-SFN scheme may be interchangeably interpreted.

In the present disclosure, a PDSCH reception method, a single DCI-based multi-TRP, and an HST-SFN scheme may be interchangeably interpreted.

In the present disclosure, single DCI-based multi-TRP repetition may be NCJT for an enhanced mobile broadband (eMBB) service (low priority, priority 0), or may be repetition for a URLLC service of an ultra-reliable and low latency communications service (high priority, priority 1).

In the present disclosure, "little," "small," "short," and "low" may be interchangeably interpreted. In the present disclosure, ignore, drop, and the like may be interchangeably interpreted.

In the present disclosure, "highest (maximum)" and "lowest (minimum)" may be interchangeably interpreted. In the present disclosure, "maximum" may be interpreted as "the n th (n is an arbitrary natural number)" largest, larger, higher, or the like, and vice versa. In the present disclosure, "minimum" may be interpreted as "the n th (n is an arbitrary natural number) smallest," smaller, lower, or the like, and vice versa. In the present disclosure, "earlier," "later," and "latest" may be interchangeably interpreted. In the present disclosure, "start" and "end" may be interchangeably interpreted.

In the present disclosure, repetition, repetition transmission, and repetition reception may be interchangeably interpreted.

A "TCI state" described in each embodiment of the present disclosure may be interpreted as a common TCI state, a unified TCI state, a joint TCI state, a separate TCI state, a separate DL TCI state, or a separate UL TCI state, and vice versa. The joint TCI state may mean a TCI state common to UL and DL. In other words, the respective embodiments of the present disclosure can also be appropriately employed in a common TCI state framework.

(Radio Communication Method)

For a UE, at least one of scheme 1 and a TRP pre-compensation scheme for a PDCCH and a PDSCH may be configured for each specific frequency band.

For example, for the UE, scheme 1/TRP pre-compensation scheme may be configured for each BWP. In other words, a higher layer parameter (RRC information element) for configuring scheme 1/TRP pre-compensation scheme may be included in a higher layer parameter for configuring a BWP.

For example, for the UE, scheme 1/TRP pre-compensation scheme may be configured for each CC. In other words, a higher layer parameter for configuring scheme 1/TRP pre-compensation scheme may be included in a higher layer parameter for configuring a CC (serving cell).

For the UE, at least one of scheme 1 and the TRP pre-compensation scheme for the PDCCH and the PDSCH may be configured for each specific frequency band.

For example, for the UE, a configuration of an HST scheme (for example, at least one of scheme 1 and the TRP pre-compensation scheme) may be configured in common for the PDSCH and the PDCCH. In other words, a higher layer parameter (RRC parameter) for configuring the HST scheme may be a higher layer parameter common to the PDSCH and the PDCCH.

For example, for the UE, configurations of an HST scheme (for example, at least one of scheme 1 and the TRP pre-compensation scheme) may be configured separately for the PDSCH and the PDCCH. In other words, a higher layer parameter (RRC parameter) for configuring the HST scheme may be separate higher layer parameters for the PDSCH and the PDCCH. In this case, a higher layer parameter for configuring an HST scheme for the PDSCH and a higher layer parameter for configuring an HST scheme for the PDCCH may indicate the same value/condition, or may indicate different values/conditions.

First Embodiment

The UE may be configured with a PDCCH/PDSCH transmission scheme by using higher layer signaling.

One or more (a plurality of) PDSCH transmission schemes configured for the UE may be supported. The UE may assume one or more (a plurality of) candidate PDSCH transmission schemes.

The PDSCH transmission schemes configured for the UE may be at least one of scheme 1-1 to scheme 1-4 below:

(Scheme 1-1): PDSCH from single TRP (defined in Rel. 15)

(Scheme 1-2): PDSCH repetition transmission from multi-TRP (defined in Rel. 16)

(Scheme 1-3): HST-SFN PDSCH (scheme 1)

(Scheme 1-4): HST-SFN PDSCH (TRP pre-compensation scheme)

A higher layer parameter for configuring/indicating at least one of scheme 1-3 and scheme 1-4 described above may be defined. The higher layer parameter may be included in a specific higher layer parameter. The specific higher layer parameter may be at least one of a PDSCH configuration (for example, a higher layer parameter "PDSCH-Config"), a PDCCH configuration (for example, a higher layer parameter "PDCCH-Config"), and another parameter other than the PDSCH configuration/PDCCH configuration.

In the present disclosure, the higher layer parameter may be interpreted as second information, second configuration information, or the like, and vice versa.

Note that the PDSCH repetition transmission in scheme 1-2 may be repetition transmission of a PDSCH to which TDM/SDM/FDM is applied.

One or more (a plurality of) PDCCH transmission schemes configured for the UE may be supported. The UE may assume one or more (a plurality of) candidate PDCCH transmission schemes.

The PDCCH transmission schemes configured for the UE may be at least one of scheme 2-1 to scheme 2-5 below:

(Scheme 2-1): PDCCH from single TRP (defined in Rel. 15)

(Scheme 2-2): PDCCH repetition transmission from multi-TRP for first reliability (Scheme 2-3): PDCCH repetition transmission from multi-TRP for second reliability (Scheme 2-4): HST-SFN PDCCH (scheme 1)

(Scheme 2-5): HST-SFN PDCCH (TRP pre-compensation scheme)

The PDCCH repetition transmission from multi-TRP for the first reliability may be PDCCH repetition transmission using two PDCCHs/CCs/CORESETs linked to each other.

The PDCCH repetition transmission from multi-TRP for the second reliability may be SFN PDCCH repetition transmission.

A higher layer parameter for configuring/indicating at least one of scheme 2-2 to scheme 2-5 described above may be defined. The higher layer parameter may be included in a specific higher layer parameter. The specific higher layer parameter may be at least one of a PDSCH configuration (for example, a higher layer parameter "PDSCH-Config"), a PDCCH configuration (for example, a higher layer parameter "PDCCH-Config"), and another parameter other than the PDSCH configuration/PDCCH configuration.

In the present disclosure, the higher layer parameter may be interpreted as first information, first configuration information, or the like, and vice versa.

Note that scheme 2-3 and scheme 2-4 described above may be configured as one scheme. Scheme 2-3 and scheme 2-4 described above may be configured simultaneously. In this case, operations for scheme 2-3 and scheme 2-4 may be defined separately. A higher layer parameter for switching between scheme 2-3 and scheme 2-4 described above may be configured for the UE. According to this, for example, it is unnecessary to define, in scheme 2-3, an operation related to signal/channel decoding in high-speed movement of the UE, and UE operation can be simplified.

According to the first embodiment above, it is possible to appropriately perform configuration/indication of a transmission scheme for a PDSCH/PDCCH.

Second Embodiment

In a second embodiment, a UE may apply a default TCI state to PDSCH reception.

The UE may apply the default TCI state to PDSCH reception when a specific condition is satisfied. The specific condition may be a case where scheduling offset is less than a threshold value (for example, timeDurationForQCL). The specific condition may be a case where a TCI field is absent in scheduling DCI and where scheduling offset is greater than or equal to a threshold value (for example, timeDurationForQCL).

Embodiment 2-1

For the UE, information related to a transmission scheme common to a PDSCH and a PDCCH may be configured for each BWP/CC.

The UE may determine, based on the information, a PDSCH transmission scheme.

Information for configuring a combination of any one of schemes 1-1 to 1-4 and any one of schemes 2-1 to 2-5 in the above first embodiment may be configured for the UE.

The combination may be a combination of arbitrary schemes. For example, the combination may be a combination of scheme 1-2 and scheme 2-3. For example, the combination may be a combination of scheme 1-3 and scheme 2-4. Examples of the combination are not limited to these.

Embodiment 2-2

For the UE, information related to individual (separate) transmission schemes for the PDSCH and the PDCCH (described hereinafter as configuration information) may be configured for each BWP/CC.

The UE may determine, based on the configuration information, a PDSCH/PDCCH transmission scheme.

The UE may apply, to PDSCH reception, a PDSCH transmission scheme configured by the configuration information (Embodiment 2-2-1).

The PDSCH transmission scheme configured by the configuration information may be any one of scheme 1-1 to scheme 1-4 described above.

Any scheme of scheme 2-1 to scheme 2-5 described above may be applied to a PDCCH for scheduling the PDSCH. The scheme applied to the PDCCH may be limited to a specific scheme from among scheme 2-1 to scheme 2-5 described above.

The UE may apply, to PDSCH reception, a PDCCH transmission scheme configured by the configuration information (Embodiment 2-2-2).

The PDCCH transmission scheme configured by the configuration information may be any one of scheme 2-1 to scheme 2-5 described above.

Information for configuring correspondence (combination/association) between each of schemes 1-1 to 1-4 for PDSCH and each of schemes 2-1 to 2-5 for PDCCH may be defined/configured. The correspondence may be notified to/configured for the UE by using higher layer signaling.

The UE may determine, based on the correspondence, a transmission scheme to be applied to the PDSCH. The UE may determine a PDSCH transmission scheme in accordance with configuration of a PDCCH transmission scheme.

When one PDCCH transmission scheme is configured for each BWP/CC, the UE may apply, to PDSCH reception, a PDSCH transmission scheme corresponding to the PDCCH transmission scheme.

When a PDCCH transmission scheme is configured for each CORESET in a given BWP/CC, the UE may apply, to PDSCH reception, a PDSCH transmission scheme corresponding to a PDCCH transmission scheme corresponding to a specific CORESET.

For example, the specific CORESET may be a CORESET of a PDCCH (scheduling PDCCH/DCI) for scheduling a PDSCH. For example, the specific CORESET may be a CORESET with a specific CORESET ID (for example, the lowest CORESET ID). For example, the specific CORESET may be a CORESET with a specific CORESET ID in a specific slot (for example, the lowest CORESET ID in the latest slot).

FIG. 6 is a diagram to show an example of correspondence between the PDCCH transmission scheme and the PDSCH transmission scheme. FIG. 6 shows correspondence between the PDCCH transmission scheme and the PDSCH transmission scheme.

In FIG. 6, PDCCH scheme 2-1, PDCCH schemes 2-2 and 2-3, PDCCH scheme 2-4, and PDCCH scheme 2-5 correspond to PDSCH scheme 1-1, PDSCH scheme 2-2, PDSCH scheme 1-3, and PDSCH scheme 1-4, respectively. The UE may determine a PDSCH transmission scheme from a PDCCH transmission scheme, based on such correspondence.

Note that a combination of transmission schemes included in the correspondence may be a combination of arbitrary schemes. In other words, examples of the combination are not limited to the example in FIG. 6.

The UE may apply, to PDCCH reception, a PDCCH transmission scheme configured by the configuration information (Embodiment 2-2-3).

The PDCCH transmission scheme configured by the configuration information may be any one of scheme 2-1 to scheme 2-5 described above.

Any scheme of scheme 1-1 to scheme 1-4 described above may be applied to a PDSCH scheduled by the PDCCH. The scheme applied to the PDSCH may be limited to a specific scheme from among scheme 1-1 to scheme 1-4 described above.

The UE may apply, to PDCCH reception, a PDSCH transmission scheme configured by the configuration information (Embodiment 2-2-4).

The PDSCH transmission scheme configured by the configuration information may be any one of scheme 1-1 to scheme 1-4 described above.

Information for configuring correspondence (combination/association) between each of schemes 1-1 to 1-4 for PDSCH and each of schemes 2-1 to 2-5 for PDCCH may be defined/configured (see FIG. 6). The correspondence may be notified to/configured for the UE by using higher layer signaling.

The UE may determine, based on the correspondence, a transmission scheme to be applied to the PDCCH. The UE may determine a PDCCH transmission scheme in accordance with configuration of a PDSCH transmission scheme.

When one PDSCH transmission scheme is configured for each BWP/CC, the UE may apply, to PDCCH reception, a PDCCH transmission scheme corresponding to the PDSCH transmission scheme.

According to the second embodiment above, it is possible to appropriately determine a PDSCH/PDCCH transmission scheme even when a default TCI state is used.

Third Embodiment

In a third embodiment, one or a plurality of (for example, two) TCI states may be indicated for a UE. The indication may be performed by a TCI field included in DCI.

Embodiment 3-1

For the UE, information related to a transmission scheme common to a PDSCH and a PDCCH may be configured for each BWP/CC.

The UE may determine, based on the information, a PDSCH transmission scheme.

Information for configuring a combination of any one of schemes 1-1 to 1-4 and any one of schemes 2-1 to 2-5 in the above first embodiment may be configured for the UE.

The combination may be a combination of arbitrary schemes. For example, the combination may be a combination of scheme 1-2 and scheme 2-3. For example, the combination may be a combination of scheme 1-3 and scheme 2-4. Examples of the combination are not limited to these.

Embodiment 3-2

For the UE, information related to individual (separate) transmission schemes for the PDSCH and the PDCCH (described hereinafter as configuration information) may be configured for each BWP/CC.

The UE may determine, based on the configuration information, a PDSCH/PDCCH transmission scheme.

The UE may apply, to PDSCH reception, a PDSCH transmission scheme configured by the configuration information (Embodiment 3-2-1).

The PDSCH transmission scheme configured by the configuration information may be any one of scheme 1-1 to scheme 1-4 described above.

Any scheme of scheme 2-1 to scheme 2-5 described above may be applied to a PDCCH for scheduling the PDSCH. The scheme applied to the PDCCH may be limited to a specific scheme from among scheme 2-1 to scheme 2-5 described above.

The UE may apply, to PDSCH reception, a PDCCH transmission scheme configured by the configuration information (Embodiment 3-2-2).

The PDCCH transmission scheme configured by the configuration information may be any one of scheme 2-1 to scheme 2-5 described above.

Information for configuring correspondence (combination/association) between each of schemes 1-1 to 1-4 for PDSCH and each of schemes 2-1 to 2-5 for PDCCH may be defined/configured. The correspondence may be notified to/configured for the UE by using higher layer signaling. The correspondence may be the same as the correspondence described in the above second embodiment.

The UE may determine, based on the correspondence, a transmission scheme to be applied to the PDSCH. The UE may determine a PDSCH transmission scheme in accordance with configuration of a PDCCH transmission scheme.

When one PDCCH transmission scheme is configured for each BWP/CC, the UE may apply, to PDSCH reception, a PDSCH transmission scheme corresponding to the PDCCH transmission scheme.

When a PDCCH transmission scheme is configured for each CORESET in a given BWP/CC, the UE may apply, to PDSCH reception, a PDSCH transmission scheme corresponding to a PDCCH transmission scheme corresponding to a specific CORESET.

For example, the specific CORESET may be a CORESET of a PDCCH (scheduling PDCCH/DCI) for scheduling a PDSCH. For example, the specific CORESET may be a CORESET with a specific CORESET ID (for example, the lowest CORESET ID). For example, the specific CORESET may be a CORESET with a specific CORESET ID in a specific slot (for example, the lowest CORESET ID in the latest slot).

The UE may apply, to PDCCH reception, a PDCCH transmission scheme configured by the configuration information (Embodiment 3-2-3).

The PDCCH transmission scheme configured by the configuration information may be any one of scheme 2-1 to scheme 2-5 described above.

Any scheme of scheme 1-1 to scheme 1-4 described above may be applied to a PDSCH scheduled by the PDCCH. The scheme applied to the PDSCH may be limited to a specific scheme from among scheme 1-1 to scheme 1-4 described above.

The UE may apply, to PDCCH reception, a PDSCH transmission scheme configured by the configuration information (Embodiment 3-2-4).

The PDSCH transmission scheme configured by the configuration information may be any one of scheme 1-1 to scheme 1-4 described above.

Information for configuring correspondence (combination/association) between each of schemes 1-1 to 1-4 for PDSCH and each of schemes 2-1 to 2-5 for PDCCH may be defined/configured (see FIG. 6). The correspondence may be notified to/configured for the UE by using higher layer signaling.

The UE may determine, based on the correspondence, a transmission scheme to be applied to the PDCCH. The UE may determine a PDCCH transmission scheme in accordance with configuration of a PDSCH transmission scheme.

When one PDSCH transmission scheme is configured for each BWP/CC, the UE may apply, to PDCCH reception, a PDCCH transmission scheme corresponding to the PDSCH transmission scheme.

According to the third embodiment above, it is possible to appropriately determine a PDSCH/PDCCH transmission scheme even when a TCI state is indicated by using DCI.

Fourth Embodiment

A transmission scheme for PDSCH may be indicated/changed for a UE by using a PDCCH/DCI/CORESET.

A PDSCH transmission scheme may be indicated for the UE in accordance with at least one of Embodiment 4-1 to Embodiment 4-3 below.

Embodiment 4-1

A PDSCH transmission scheme may be indicated for the UE, based on a specific field included in the DCI.

The specific field may be a new field defined in Rel. 17 (or later versions). The specific field may be an existing field (defined in Rel. 16 (or earlier versions)).

For example, the specific field may be a TCI field. When the TCI field indicates a specific codepoint, the UE may determine a PDSCH transmission scheme corresponding to the codepoint.

By using the TCI field for indication of the PDSCH transmission scheme, it is possible to perform judgment of a transmission scheme based on the number of TCI states indicated by the TCI field.

For example, when the TCI field indicates one TCI state, the UE may determine that scheme 1-1 above has been indicated. When the TCI field indicates two TCI states, the UE may determine that any one of schemes 1-2 to 1-4 above has been indicated. The UE may determine any one of schemes 1-2 to 1-4 above, based on a codepoint of the TCI field.

Information related to correspondence between a TCI codepoint and a transmission scheme may be configured for the UE. The information may be configured for/notified to the UE by using higher layer signaling.

Embodiment 4-2

The UE may determine a PDSCH transmission scheme, based on a CORESET (scheduling CORESET) corresponding to a PDCCH/DCI for scheduling a PDSCH.

A transmission scheme may separately correspond to each CORESET (CORESET ID). For example, a different transmission scheme may be configured for each CORESET (CORESET ID).

Correspondence between the scheduling CORESET and the PDSCH to be scheduled may be configured for the UE. The correspondence may be configured for/notified to the UE by using higher layer signaling.

The UE may determine the PDSCH transmission scheme, based on a PDCCH transmission scheme corresponding to the scheduling CORESET.

Correspondence between the PDCCH transmission scheme and the PDSCH transmission scheme may be defined/configured. The correspondence may be the same as the correspondence described in the above second embodiment.

Embodiment 4-3

The UE may determine a PDSCH transmission scheme, based on a specific CORESET.

A transmission scheme may separately correspond to each CORESET (CORESET ID). For example, a different transmission scheme may be configured for each CORESET (CORESET ID).

For example, the specific CORESET may be a CORESET of a PDCCH (scheduling PDCCH/DCI) for scheduling a PDSCH. For example, the specific CORESET may be a CORESET with a specific CORESET ID (for example, the lowest CORESET ID). For example, the specific CORESET may be a CORESET with a specific CORESET ID in a specific slot (for example, the lowest CORESET ID in the latest slot).

The UE may determine the PDSCH transmission scheme, based on a PDCCH transmission scheme corresponding to the specific CORESET.

Correspondence between the PDCCH transmission scheme and the PDSCH transmission scheme may be defined/configured. The correspondence may be the same as the correspondence described in the above second embodiment.

According to the fourth embodiment above, it is possible to appropriately indicate/change a transmission scheme for PDSCH by using a PDCCH/DCI/CORESET.

Fifth Embodiment

A higher layer parameter (RRC IE)/UE capability corresponding to a function (characteristics, feature) in at least one of a plurality of embodiments above may be defined. The UE capability may indicate support of this function.

The UE configured with the higher layer parameter (for enabling the function) corresponding to the function may perform the function. "The UE not configured with the higher layer parameter corresponding to the function does not perform the function (for example, follows Rel. 15/16)" may be defined.

The UE that has reported the UE capability indicating support of the function may perform the function. "The UE that has not reported the UE capability indicating support of the function does not perform the function (for example, follows Rel. 15/16)" may be defined.

When the UE reports the UE capability indicating support of the function and is configured with the higher layer parameter corresponding to the function, the UE may perform the function. "When the UE does not report the UE capability indicating support of the function or when the UE is not configured with the higher layer parameter corresponding to the function, the UE does not perform the function (for example, follows Rel. 15/16)" may be defined.

The UE capability may indicate whether the UE supports this function.

The function may be application of a default TCI state/spatial relation/PL-RS.

The function may be application of one or two default TCI states/spatial relations/PL-RSS.

The UE capability may be defined as whether the UE supports an HST scheme/SFN scheme for PDCCH/PDSCH.

The UE capability may be defined as whether the UE supports configuration/indication/switching of a transmission scheme for PDCCH/PDSCH, the configuration/indication/switching using higher layer signaling/DCI.

The UE capability may be defined as whether the UE supports PDSCH/PDCCH repetition reception from multi-TRP.

The UE capability may be defined as how many repetitions of PDSCH/PDCCH repetition reception from multi-TRP the UE supports.

The UE capability may be defined as whether the UE supports, for PDSCH/PDCCH repetition reception from multi-TRP, at least one of intra-slot repetition and inter-slot repetition.

The UE capability may be defined as whether the UE supports a default TCI state of a PDSCH in an SFN-PDCCH/PDSCH repetition.

According to the fifth embodiment above, the UE can implement the above function while maintaining compatibility with an existing specification.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
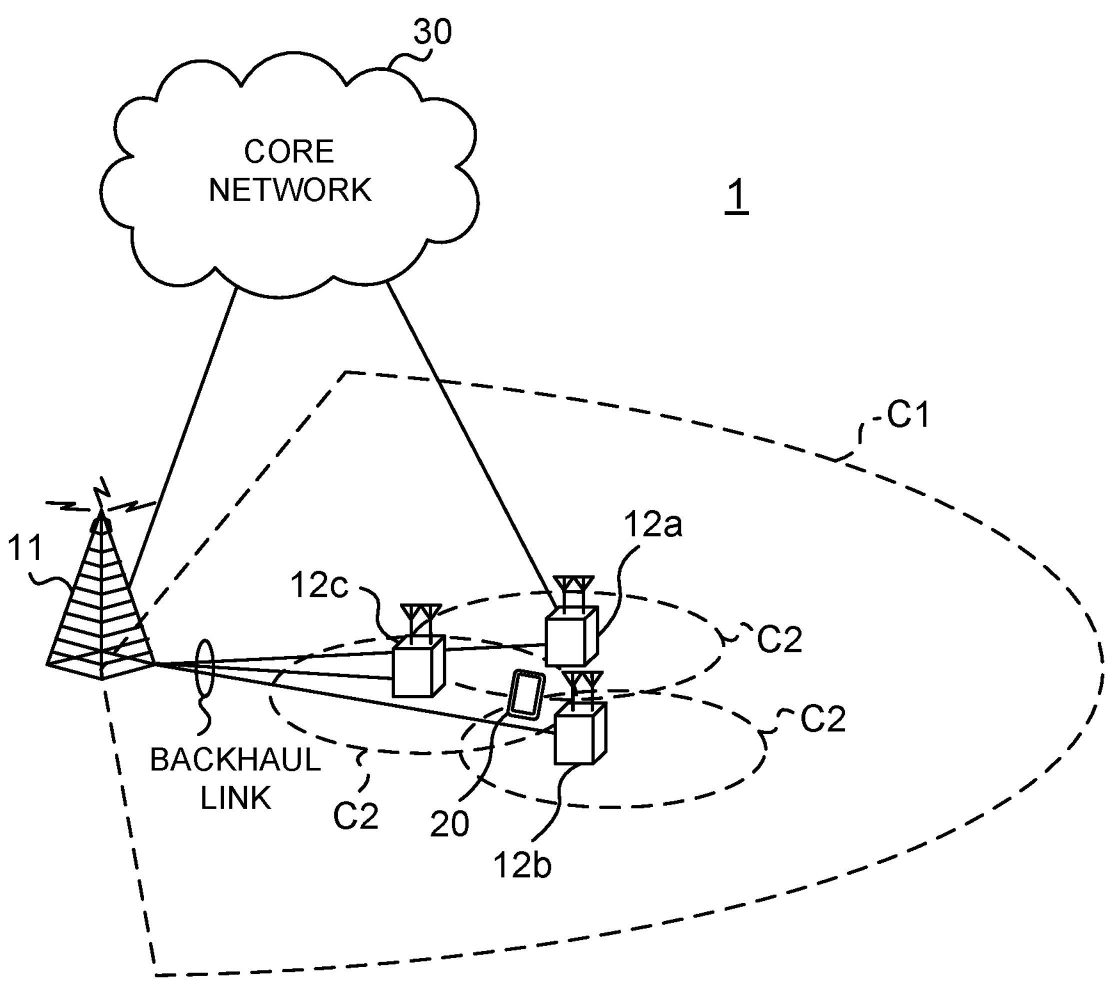
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 8:
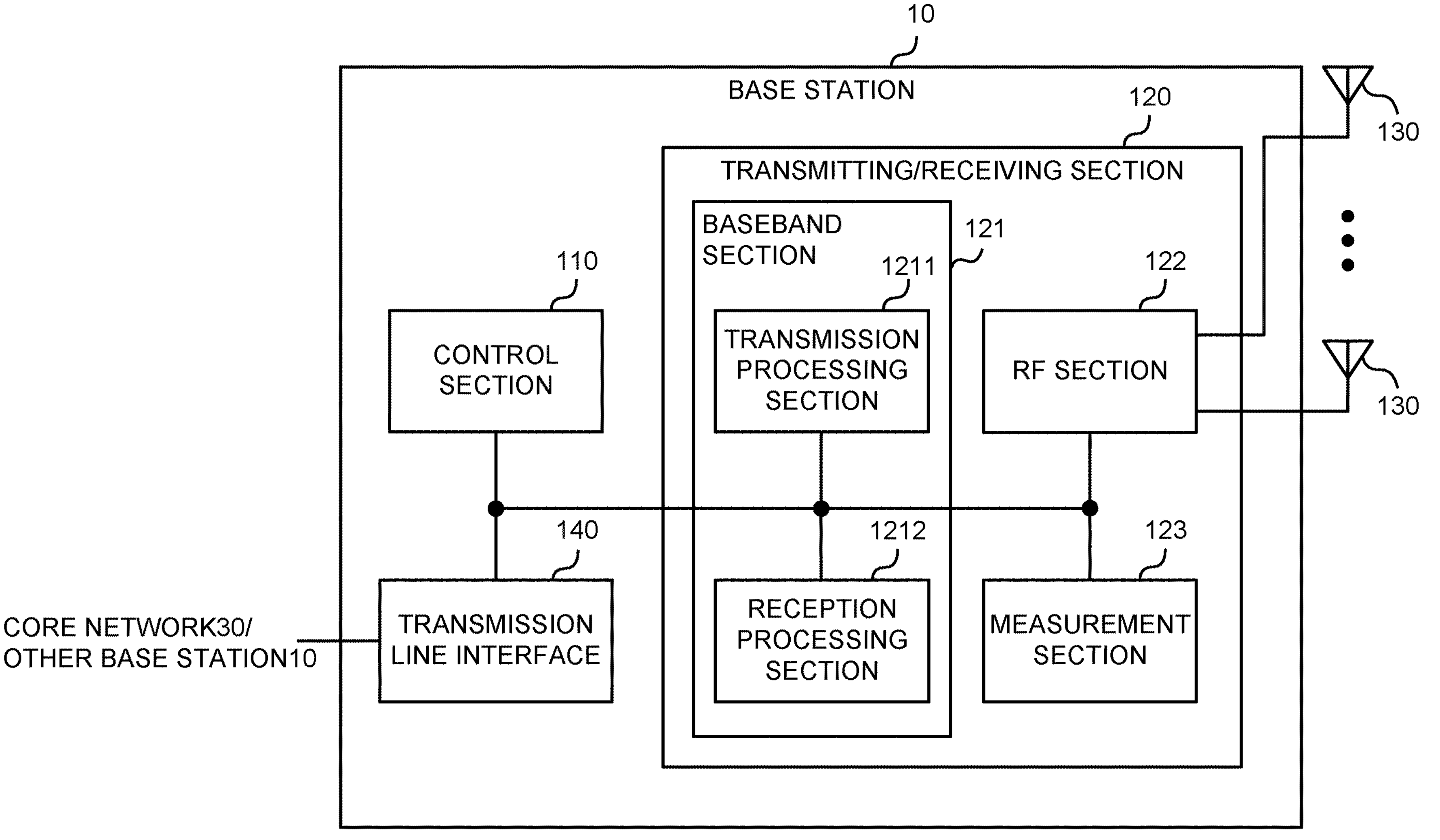
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit at least one of first information related to a physical downlink control channel (PDCCH) transmission scheme and second information related to a physical downlink shared channel (PDSCH) transmission scheme. The control section 110 may configure, by using at least one of the first information and the second information, at least one of a first transmission scheme to be applied to reception of a PDCCH and a second transmission scheme to be applied to reception of a PDSCH. The first transmission scheme may be any one of a PDCCH transmission scheme for single transmission/reception point (TRP) (for example, scheme 2-1 described above), a transmission scheme for PDCCH repetition transmission for multi-TRP (for example, scheme 2-2/2-3 described above), and a single frequency network (SFN) PDCCH transmission scheme (for example, scheme 2-4/2-5 described above). The second transmission scheme may be any one of a PDSCH transmission scheme for single TRP (for example, scheme 1-1 described above), a transmission scheme for PDSCH repetition transmission for multi-TRP (for example, scheme 1-2 described above), and an SFN PDSCH transmission scheme (for example, scheme 1-3/1-4 described above) (first to fourth embodiments).

(User Terminal)

Figure 9:
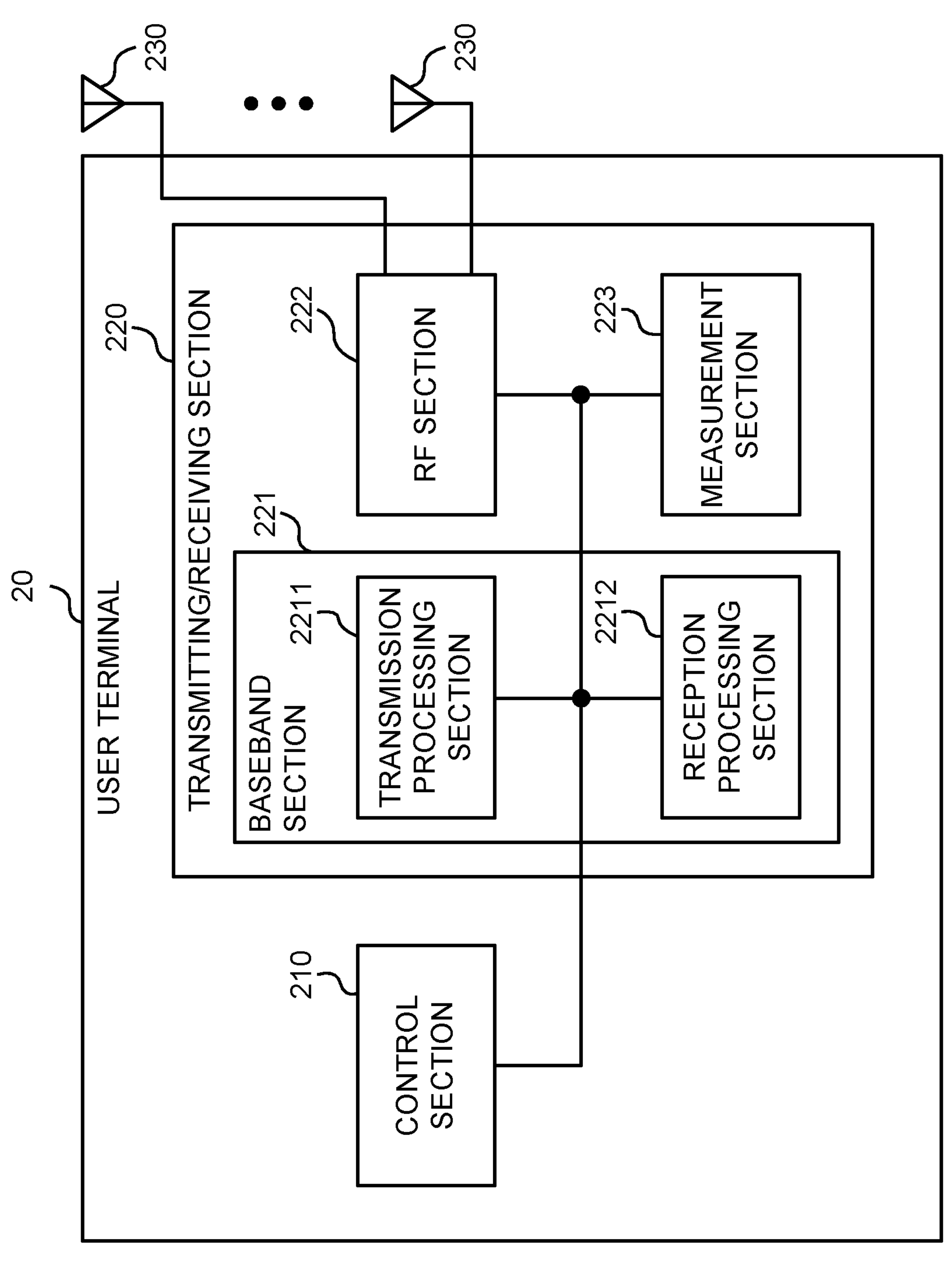
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive at least one of first information related to a physical downlink control channel (PDCCH) transmission scheme and second information related to a physical downlink shared channel (PDSCH) transmission scheme. The control section 210 may determine, based on at least one of the first information and the second information, at least one of a first transmission scheme to be applied to reception of a PDCCH and a second transmission scheme to be applied to reception of a PDSCH. The first transmission scheme may be any one of a PDCCH transmission scheme for single transmission/reception point (TRP) (for example, scheme 2-1 described above), a transmission scheme for PDCCH repetition transmission for multi-TRP (for example, scheme 2-2/2-3 described above), and a single frequency network (SFN) PDCCH transmission scheme (for example, scheme 2-4/2-5 described above). The second transmission scheme may be any one of a PDSCH transmission scheme for single TRP (for example, scheme 1-1 described above), a transmission scheme for PDSCH repetition transmission for multi-TRP (for example, scheme 1-2 described above), and an SFN PDSCH transmission scheme (for example, scheme 1-3/1-4 described above) (first to fourth embodiments).

When a period from reception of downlink control information (DCI) transmitted in the PDCCH until reception of the PDSCH scheduled by the DCI is less than a threshold value, or when the DCI does not include a transmission configuration indication state field and the period is greater than or equal to the threshold value, the control section 210 may determine, based on at least one of the first information and the second information, at least one of the first transmission scheme and the second transmission scheme (second embodiment).

When downlink control information (DCI) transmitted in the PDCCH includes a transmission configuration indication state field, the control section 210 may determine, based on at least one of the first information and the second information, at least one of the first transmission scheme and the second transmission scheme (third embodiment).

The control section 210 may further determine the second transmission scheme, based on at least one of downlink control information transmitted in the PDCCH for scheduling the PDSCH and a control resource set corresponding to the PDCCH for scheduling the PDSCH (fourth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
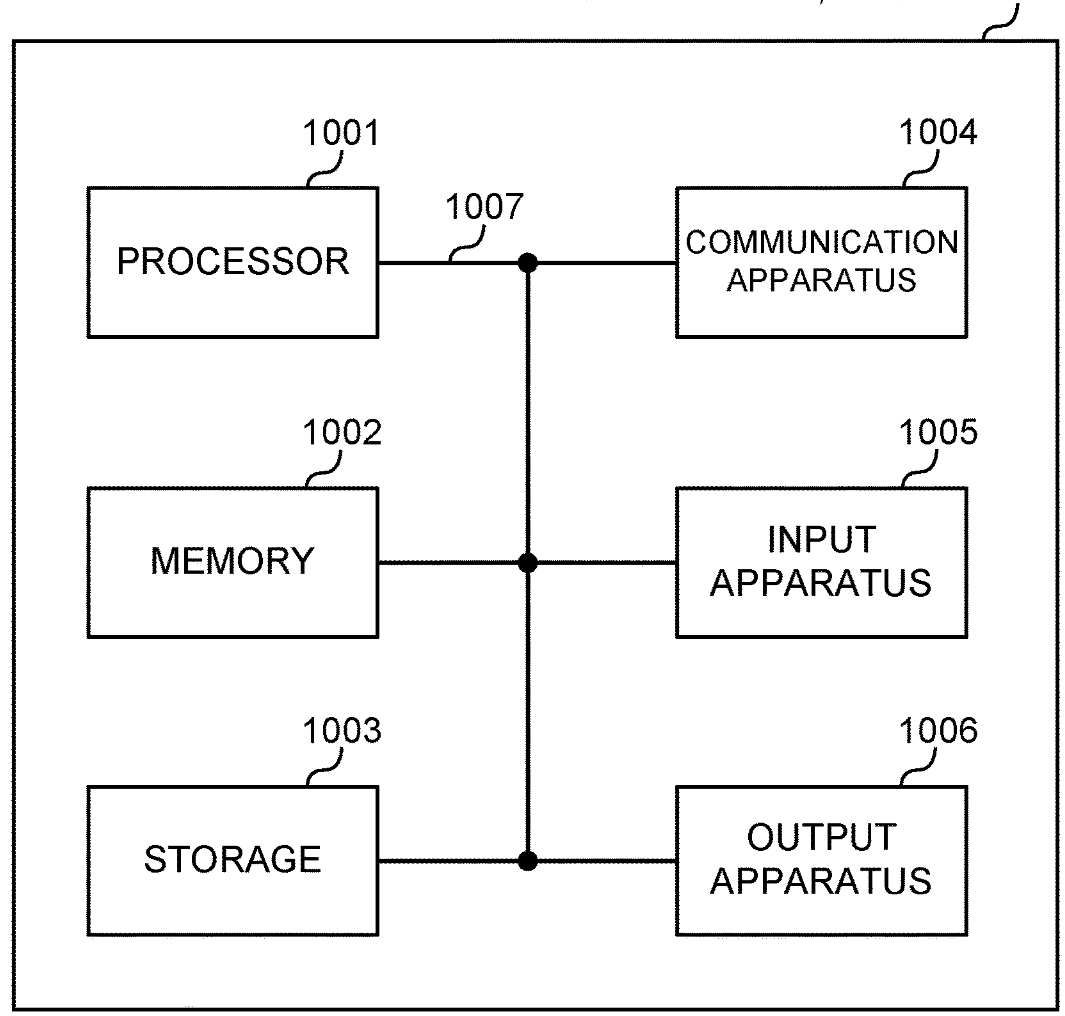
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG), "a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CES).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as “precoding,” a “precoder,” a “weight (precoding weight),” “quasi-co-location (QCL),” a “Transmission Configuration Indication state (TCI state),” a “spatial relation,” a “spatial domain filter,” a “transmit power,” “phase rotation,” an “antenna port,” an “antenna port group,” a “layer,” “the number of layers,” a “rank,” a “resource,” a “resource set,” a “resource group,” a “beam,” a “beam width,” a “beam angular degree,” an “antenna,” an “antenna element,” a “panel,” and so on can be used interchangeably.

In the present disclosure, the terms such as a “base station (BS),” a “radio base station,” a “fixed station,” a “NodeB,” an “eNB (eNodeB),” a “gNB (gNodeB),” an “access point,” a “transmission point (TP),” a “reception point (RP),” a “transmission/reception point (TRP),” a “panel,” a “cell,” a “sector,” a “cell group,” a “carrier,” a “component carrier,” and so on can be used interchangeably. The base station may be referred to as the terms such as a “macro cell,” a small cell, “a “femto cell,” a “pico cell,” and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term “cell” or “sector” refers to part of or the entire coverage area of at least one of a base station and a base station subsystem that provides communication services within this coverage.

In the present disclosure, the terms “mobile station (MS),” “user terminal,” “user equipment (UE),” and “terminal” may be used interchangeably.

A mobile station may be referred to as a “subscriber station,” “mobile unit,” “subscriber unit,” “wireless unit,” “remote unit,” “mobile device,” “wireless device,” “wireless communication device,” “remote device,” “mobile subscriber station,” “access terminal,” “mobile terminal,” “wireless terminal,” “remote terminal,” “handset,” “user agent,” “mobile client,” “client,” or some other appropriate terms in some cases.

At least one of a base station and a mobile station may be referred to as a “transmitting apparatus,” a “receiving apparatus,” a “radio communication apparatus,” and so on. Note that at least one of a base station and a mobile station may be a device mounted on a moving object or a moving object itself, and so on.

The moving object is a movable object with any moving speed, and a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, and these are not restrictive. The moving object may be a moving object that autonomously travels based on a direction for moving.

The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Figure 11:
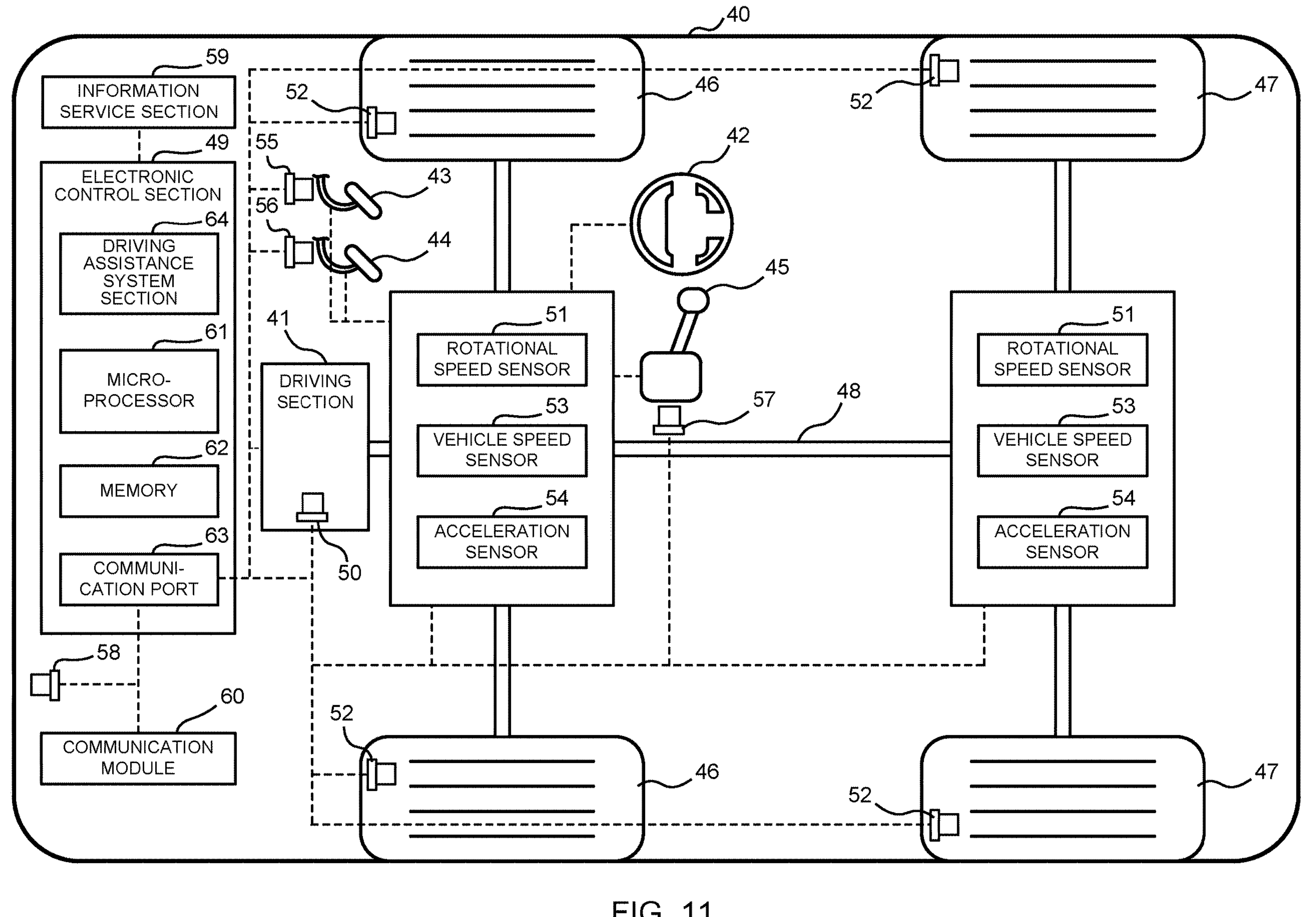
FIG. 11 is a diagram to show an example of a vehicle according to one embodiment.

FIG. 11 is a diagram to show an example of a vehicle according to one embodiment. A vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, a rotational speed sensor 51, a pneumatic sensor 52, a vehicle speed sensor 53, an acceleration sensor 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, a rotational speed signal of the front wheels 46/rear wheels 47 acquired by the rotational speed sensor 51, a pneumatic signal of the front wheels 46/rear wheels 47 acquired by the pneumatic sensor 52, a vehicle speed signal acquired by the vehicle speed sensor 53, an acceleration signal acquired by the acceleration sensor 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing (outputting) various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

The information service section 59 may include an input device (for example, a keyboard, a mouse, a microphone, a switch, a button, a sensor, a touch panel, and the like) for receiving input from the outside, or may include an output device (for example, a display, a speaker, an LED lamp, a touch panel, and the like) for implementing output to the outside.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV)) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUs that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, the above-mentioned base station 10, user terminal 20, or the like (may function as the base station 10, user terminal 20, or the like).

The communication module 60 may transmit at least one of signals from the various sensors 50 to 58 described above input to the electronic control section 49, information obtained based on the signals, and information based on an input from the outside (a user) obtained via the information service section 59, to the external apparatus via radio communication. The electronic control section 49, the various sensors 50 to 58, the information service section 59, and the like may be referred to as input sections that receive input. For example, the PUSCH transmitted by the communication module 60 may include information based on the input.

The communication module 60 receives various pieces of information (traffic information, signal information, inter-vehicle distance information, and the like) transmitted from the external apparatus, and displays the various pieces of information on the information service section 59 included in the vehicle. The information service section 59 may be referred to as an output section that outputs information (for example, outputs information to devices, such as a display and a speaker, based on the PDSCH received by the communication module 60 (or data/information decoded from the PDSCH)).

The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, next-generation systems that are enhanced, modified, created, or defined based on these, and the like. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

This application is based on Japanese Patent Application No. 2021-166868 filed on Oct. 11, 2021. The entire contents of the application are herein incorporated.

The invention claimed is:

1. A terminal comprising:

a receiver that receives, in a specific control resource set (CORESET), downlink control information (DCI) not including a transmission configuration indication (TCI) field, the DCI being transmitted in a physical downlink control channel (PDCCH); and a processor that, when a physical downlink shared channel (PDSCH) is scheduled by the DCI and a time offset between reception of the DCI and reception of the PDSCH is greater than or equal to a threshold, assumes that a TCI state for the PDSCH is the same as a TCI state for the specific CORESET, wherein the processor determines, based on the specific CORESET, that one of a scheme for high-speed movement and a scheme for single transmission/reception point (TRP) is applied as a transmission scheme for the PDSCH.

2. The terminal according to claim 1, wherein the receiver receives first information regarding a transmission scheme for the PDCCH and second information regarding the transmission scheme for the PDSCH.

3. The terminal according to claim 1, wherein the processor controls reporting of capability information indicating support of switching of a transmission scheme for a PDSCH using DCI.

4. The terminal according to claim 2, wherein the processor controls reporting of capability information indicating support of switching of a transmission scheme for a PDSCH using DCI.

5. A radio communication method for a terminal, comprising:

receiving, in a specific control resource set (CORESET), downlink control information (DCI) not including a transmission configuration indication (TCI) field, the DCI being transmitted in a physical downlink control channel (PDCCH);

when a physical downlink shared channel (PDSCH) is scheduled by the DCI and a time offset between reception of the DCI and reception of the PDSCH is greater than or equal to a threshold, assuming that a TCI state for the PDSCH is the same as a TCI state for the specific CORESET; and determining, based on the specific CORESET, that one of a scheme for high-speed movement and a scheme for single transmission/reception point (TRP) is applied as a transmission scheme for the PDSCH.

6. A system comprising a terminal and a base station, wherein the terminal comprises:

a receiver that receives, in a specific control resource set (CORESET), downlink control information (DCI) not including a transmission configuration indication (TCI) field, the DCI being transmitted in a physical downlink control channel (PDCCH); and a processor that, when a physical downlink shared channel (PDSCH) is scheduled by the DCI and a time offset between reception of the DCI and reception of the PDSCH is greater than or equal to a threshold, assumes that a TCI state for the PDSCH is the same as a TCI state for the specific CORESET, wherein the processor determines, based on the specific CORESET, that one of a scheme high-speed movement and a scheme for single transmission/reception point (TRP) is applied as a transmission scheme for the PDSCH, and the base station comprises:

a transmitter that transmits the DCI and the PDSCH.

* * * * *